(12) United States Patent
Mayuzumi

(10) Patent No.: US 12,086,893 B2
(45) Date of Patent: Sep. 10, 2024

(54) INFORMATION PROCESSING APPARATUS, INFORMATION PROCESSING METHOD, AND RECORDING MEDIUM

(71) Applicant: Ryusuke Mayuzumi, Kanagawa (JP)

(72) Inventor: Ryusuke Mayuzumi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 103 days.

(21) Appl. No.: 17/488,310

(22) Filed: Sep. 29, 2021

(65) Prior Publication Data

US 2022/0101454 A1 Mar. 31, 2022

(30) Foreign Application Priority Data

Sep. 29, 2020 (JP) .................. 2020-164090

(51) Int. Cl.
*G06Q 20/00* (2012.01)
*G06Q 50/06* (2012.01)
*G06F 21/10* (2013.01)

(52) U.S. Cl.
CPC ......... *G06Q 50/06* (2013.01); *G06F 21/1085* (2023.08); *G06F 2221/2141* (2013.01); *G06Q 2220/00* (2013.01)

(58) Field of Classification Search
CPC .... G06Q 50/06; G06Q 2220/00; G06F 21/10; G06F 2221/0788; G06F 2221/2141; G06F 21/6218; Y04S 40/20
See application file for complete search history.

(56) References Cited

U.S. PATENT DOCUMENTS

| | | | |
|---|---|---|---|
| 2019/0087920 A1 | 3/2019 | Cui et al. | |
| 2019/0164236 A1* | 5/2019 | Mayne | G06Q 20/389 |
| 2021/0295454 A1 | 9/2021 | Mayuzumi | |
| 2021/0295455 A1 | 9/2021 | Aoshima et al. | |
| 2021/0296895 A1 | 9/2021 | Mayuzumi | |

FOREIGN PATENT DOCUMENTS

| | | | |
|---|---|---|---|
| JP | 2019-144626 A | 8/2019 | |
| JP | 2019-144851 | 8/2019 | |
| JP | 2019-175417 A | 10/2019 | |
| JP | 2020-107202 A | 7/2020 | |
| JP | 7028297 B1 * | 3/2022 | ............ G06F 21/10 |
| WO | WO-2013118511 A1 * | 8/2013 | ............ G06F 13/00 |
| WO | 2019/161019 A1 | 8/2019 | |

OTHER PUBLICATIONS

Foreign Ref. Incldued (Year: 2022).*
Foreign Ref. included (Year: 2013).*
U.S. Appl. No. 17/206,338, filed Mar. 19, 2021, 2021/0296895, Ryusuke Mayuzumi, Sep. 23, 2021.
Office Action issued Oct. 26, 2021 in Japanese Patent Application No. 2020-164090, 3 pages.

* cited by examiner

*Primary Examiner* — Dante Ravetti
(74) *Attorney, Agent, or Firm* — XSENSUS LLP

(57) ABSTRACT

An apparatus includes circuitry to: in response to a request for processing first information indicating an ownership of energy, determine whether a requester of the request has authority to process the first information and based on a determination indicating that the requester has authority to process the first information, generate second information for tracking enemy that instructs processing of the first information.

19 Claims, 20 Drawing Sheets

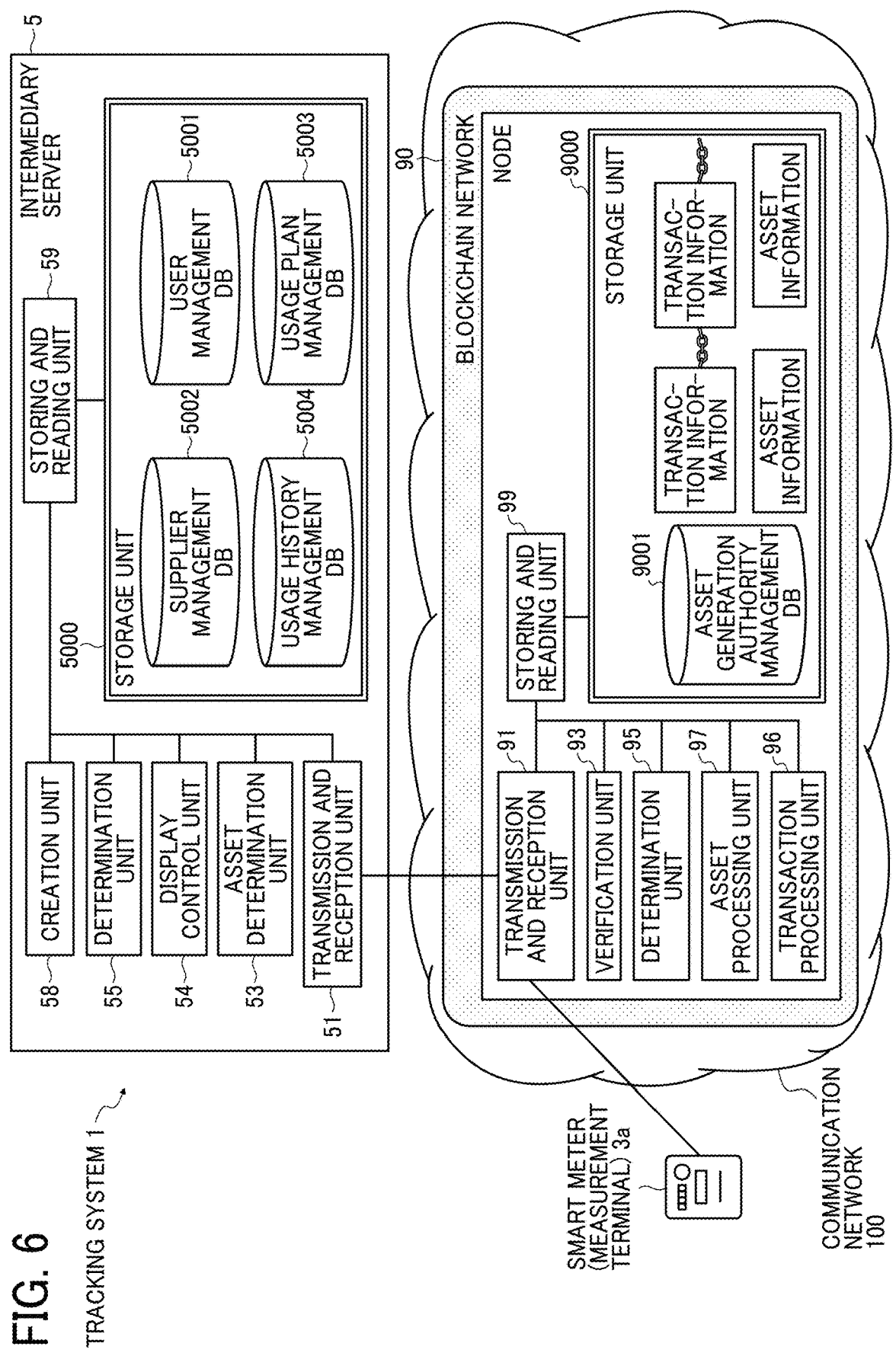

FIG. 7A

| USER ID | USER NAME | USER ADDRESS | SELECTABLE SUPPLIER ID |
|---|---|---|---|
| U0001 | CONSUMER Ca | TOKYO・・・ | P0001, P0002, ・・・ |
| U0002 | CONSUMER Cb | OSAKA・・・ | P0001, P0004, ・・・ |
| ・・・ | ・・・ | ・・・ | ・・・ |

FIG. 7B

| SUPPLIER ID | SUPPLIER NAME | PRODUCTION METHOD | AVAILABLE POWER (kWh) |
|---|---|---|---|
| P0001 | PRODUCER Aa | SOLAR | 100 |
| P0002 | PRODUCER Ab | OIL | 500 |
| ・・・ | ・・・ | ・・・ | ・・・ |

FIG. 8A

| USER ID | START DATE | END DATE | PLANNED CONSUMPTION (kWh) | USAGE RATIO OF RENEWABLE ENERGY (%) | SUPPLIER ID | SUPPLIER NAME | PRODUCTION METHOD |
|---|---|---|---|---|---|---|---|
| U0001 | 2020.1.1 | 2020.12.31 | 20 | 40 | P0001 | PRODUCER Aa | SOLAR |
| | | | | | P0002 | PRODUCER Ab | OIL |
| ... | ... | ... | ... | ... | ... | ... | ... |

FIG. 8B

USER ID: U0001

| USAGE DATE/TIME | USAGE AMOUNT (kWh) | PRODUCTION METHOD | TOTAL USAGE FOR SOLAR (kWh) | TOTAL USAGE FOR OIL (kWh) |
|---|---|---|---|---|
| 2020.1.1 0:00-0:30 | 10 | OIL | | 10 |
| 2020.1.1 0:30-1:00 | 10 | OIL | | 20 |
| ... | ... | ... | ... | ... |
| 2020.1.1 7:30-8:00 | 10 | OIL | | 160 |
| 2020.1.1 8:00-8:30 | 10 | SOLAR | 10 | |
| 2020.1.1 8:30-9:00 | 10 | SOLAR | 20 | |

FIG. 9

| ATTRIBUTE OF REQUESTER | PERMITTED TO REQUEST ASSET GENERATION | PERMITTED TO REQUEST ASSET CHANGE |
|---|---|---|
| SUPPLIER | YES | NO |
| INTERMEDIARY AGENT | NO | YES |
| CONSUMER | NO | NO |
| SUPPLIER AND CONSUMER | YES | NO |

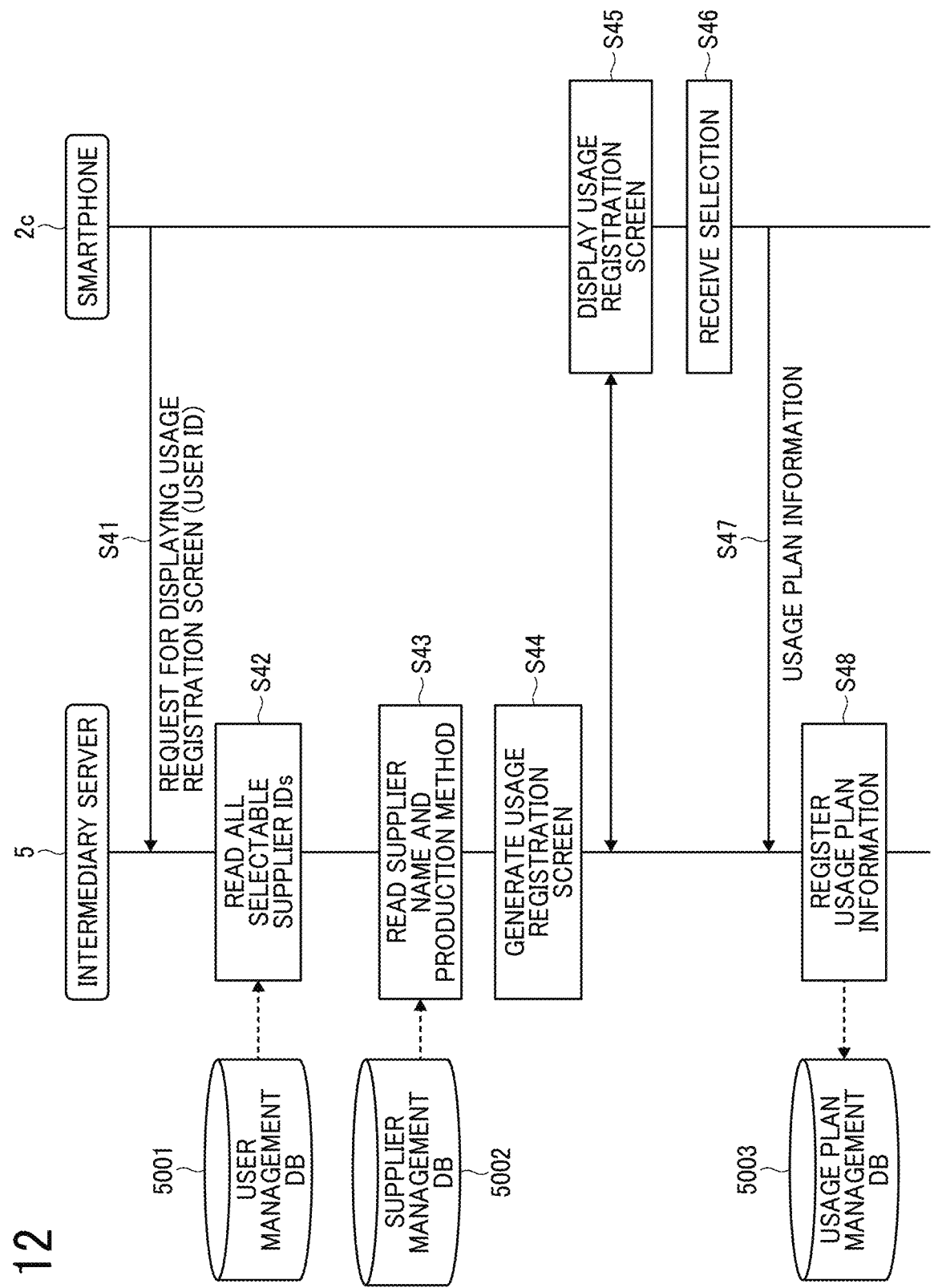

FIG. 13A

USAGE REGISTRATION

START DATE [ ]
END DATE [ ]
PLANNED CONSUMPTION [ ] kWh
USAGE RATIO OF RENEWABLE ENERGY [ ] %

| SUPPLIER | PRODUCTION METHOD | AVAILABLE POWER (kWh) |
|---|---|---|
| ☐ PRODUCER Aa | SOLAR | 100 |
| ☐ PRODUCER Ab | OIL | 500 |
| ... | | |

[CANCEL] [OK]

FIG. 13B

USAGE REGISTRATION

START DATE [2020.1.1]
END DATE [2020.12.31]
PLANNED CONSUMPTION [20] kWh
USAGE RATIO OF RENEWABLE ENERGY [40] %

| SUPPLIER | PRODUCTION METHOD | AVAILABLE POWER (kWh) |
|---|---|---|
| ☐ PRODUCER Aa | SOLAR | 100 |
| ☐ PRODUCER Ab | OIL | 500 |
| ... | | |

[CANCEL] [OK]

INFORMATION PROCESSING APPARATUS, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2020-164090, filed on Sep. 29, 2020, in the Japan Patent Office, the entire disclosure of which is hereby incorporated by reference herein.

BACKGROUND

Technical Field

The present disclosure relates to an information processing apparatus, an information processing method, and a recording medium.

Related Art

In recent years, electricity produced from renewable energy has been attracting attention. In this disclosure, green power is defined as electricity produced from a subset of renewable resources such as solar (solar light or solar heat), wind, power, biomass, geothermal power, hydropower, and heat in the atmosphere. Compared to the case where the fossil fuel such as oil, coal, and liquefied natural gas is used to produce electricity, production of electricity using renewable energy emits almost no $CO_2$, which is a cause for global warming. That is, renewable energy is an energy resource that is environmentally friendly, from among various energy resources used for producing electricity today. By operating such as factories using the above-described power based on renewable energy, which is environmentally friendly, companies can increase brand credibility.

SUMMARY

In one exemplary embodiment, an apparatus includes circuitry to: in response to a request for processing first information indicating an ownership of energy, determine whether a requester of the request has authority to process the first information; and based on a determination indicating that the requester has authority to process the first information, generate second information for tracking energy that instructs processing of the first in formation.

In one exemplary embodiment, a method includes: in response to a request for processing first information indicating an ownership of energy, determining whether a requester of the request has authority to process the first information; and based on a determination indicating that the requester has authority to process the first information, generating second information for tracking energy that instructs processing of the first information.

In one exemplar embodiment, a non-transitory recording medium encoded with computer-readable instructions that, when executed by a processor, cause the processor to perform a method of tracking exchange of energy, the method including: in response to a request for processing first information indicating an ownership of energy, determining whether a requester of the request has authority to process the first information; and based on a determination indicating that the requester has authority to process the first information, generating second information for tracking energy that instructs processing of the first information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a schematic block diagram illustrating a functional configuration of the intermediary server and the node in the tracking system of FIG. 1, according to the exemplary embodiment;

FIG. 7A is a conceptual diagram illustrating an example of user management table;

FIG. 7B is a conceptual diagram illustrating an example of supplier management table;

FIG. 8A is a conceptual diagram illustrating an example of use plan management table;

FIG. 8B is a conceptual diagram illustrating an example of usage history management table;

FIG. 9 is a conceptual diagram illustrating an example of asset generation authority management table;

FIG. 12 is a sequence diagram illustrating processing of registering usage plan of assets according to the exemplary embodiment;

FIG. 13A is an illustration of an example usage plan registration screen before information is entered or selected;

FIG. 13B is an illustration of an example usage plan registration screen after information is entered or selected;

Figure 1:
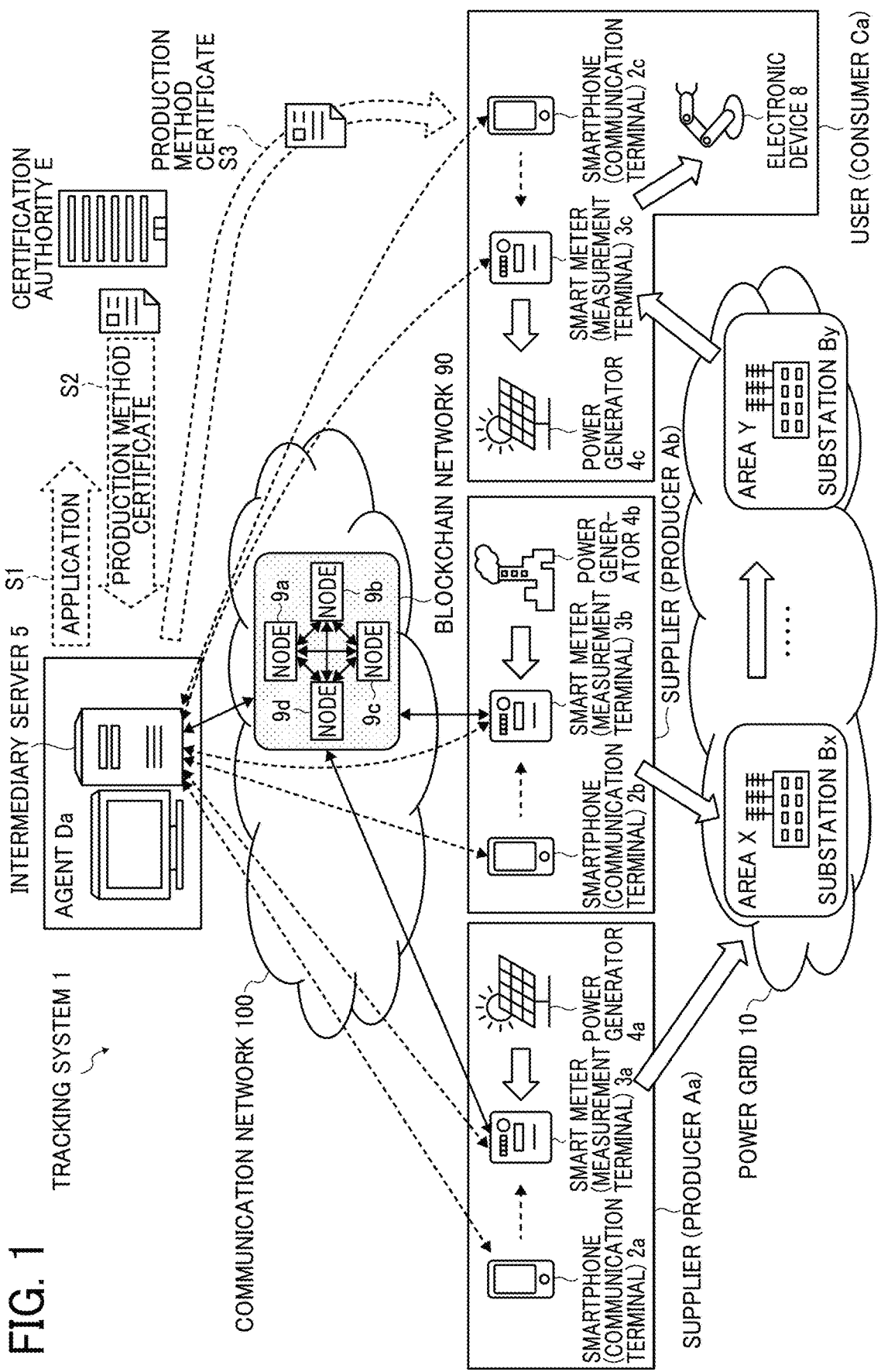
FIG. 1 is a schematic view illustrating a tracking system according to an exemplary embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described in detail below, with reference to the drawings.

Overview of System Configuration

First, overview of a configuration of a tracking system 1 is described according to one or more exemplary embodiments. FIG. 1 is a schematic view of an example of tracking system according to the present embodiment. Here, the case in which electricity, which is an example of energy, is used as an example of an asset is described. In this disclosure, the asset is an item that has value. The ownership of the asset and the production method of the asset are managed using asset information described later. Since the electricity, as an example of energy, is used as the asset in this example, the asset information may be referred to as energy information. Further, as described below, the transaction information is generated to generate or change the asset information. Since the transaction information is used to track ownership of the asset, the transaction information may be referred to as tracking information.

Explanation on Each Entity in the Tracking System

As illustrated in FIG. 1, the tracking system 1 is used by a producer Aa of electricity, a producer Ab of electricity, a consumer Ca of electricity, an intermediary agent Da, and a certification authority E.

Producer Aa, an example of a supplier, is an entity that produces electricity from solar light, as one example of an entity that produces green electricity from renewable energy resource. Producer Ab, an example of a supplier, is an entity that produces electricity from oil as an example of fossil fuel. The supplier may be a union that purchases items from each producer and resells the items.

The consumer Ca, an example of a user of electricity, is an entity that consumes electricity supplied from the producer Aa or Ab. In this example, the consumer Ca is also an example of a supplier like the producer Aa, which is an entity that produces electricity from solar light, as one example of an entity that produces green electricity from renewable energy resource. For example, the consumer Ca produces electricity by itself, but purchases electricity from another supplier if the produced electricity is insufficient.

In case the asset is not consumed like electricity, such as in the case of a real estate property, the user may be an owner who currently owns the asset.

The intermediary agent Da is an entity that intermediates transfer of ownership of electricity between different entities.

The certification authority E is a public institution such as a national or local public entity that certifies a certain type of electricity production method. Electricity production methods can be determined based on, for example, a type of energy resource used to produce electricity. Assuming that the electricity production method is defined by a type of energy resource, examples of electricity production method include a production method using solar (such as solar light or solar heat), a production method using wind (such as wind power), a production method using biomass, a production method using geothermal power, a production method using hydroelectric resources, a production method using heat in the atmosphere, and a production method using nuclear power. Of those various types of electricity production methods, the electricity production methods using renewable energy resources, such as solar light, solar heat, wind power, biomass, geothermal power, hydropower, and heat in the atmosphere are grouped into a production method using renewable energy. The electricity production methods using petroleum, coal, and liquefied natural gas are grouped into a production method using conventional energy such as fossil fuel. Compared to the production method using conventional energy, the production method using renewable energy emits almost no $CO_2$, which is a cause for global warming. That is, renewable energy is an energy resource that is environmentally friendly. In this disclosure, as examples of renewable energy resource, solar light or heat, wind power, biomass, geothermal power, hydropower, and heat in the atmosphere are referred, for the descriptive purposes. Further, as examples of conventional energy resource, fossil fuel, such as oil, coal, and liquefied natural gas are referred, for the descriptive purposes.

The intermediary agent Da, as an intermediator, sends an application form to the certification authority E by mail or the like on behalf of the customer Ca, receives a production method certificate of the customer Ca from the certification authority E, and sends the production method certificate to the consumer Ca by mail or the like. The production method certificate, for example, describes a usage ratio of renewable energy, which is a ratio that the customer Ca uses electricity produced from renewable energy, among electricity consumed by the customer Ca. With the production method certificate, the consumer Ca can apply for public subsidy, based on the renewable energy usage ratio (or $CO_2$ reduction rate) of the consumer Ca, or total usage of renewable energy of the consumer Ca.

The number of producers may be, one or three or more. There may be multiple consumers or intermediary agents.

Power Transmission and Distribution Network

The substation Bx is a substation nearest to the producers Aa and Ab. The substation By is a substation nearest to the consumer Ca. The power distribution network 10, which may be referred to as the power grid 10, includes substations Bx and By, and transmission lines, and distribution lines, etc. The electricity supplied from the producers Aa and Ab is distributed to the consumer Ca via the power grid 10.

Data Communication Network

The producer Aa is equipped with a smartphone 2a, a smart meter 3a, and a power generator 4a. The producer Ab is equipped with a smartphone 2b, a smart meter 3b, and a power generator 4b. The consumer Ca is equipped with a smartphone 2c, a smart meter 3c, a power generator 4c, and an electric device 8. The intermediary agent Da manages an intermediary server 5. The intermediary agent Da may be an organization such as a corporation or an individual (for example, a president, an executive officer, or an employee such as an information technology (IT) system administrator).

The number of smartphones may be two or four or more, for example, depending on the number of producers and consumers. Hereinafter, the smartphones 2a, 2b, and 2c may be collectively referred to as the smartphone 2. Further, the number of smart meters may be two or four or more, for example, depending on the number of producers and consumers. Hereinafter, the smart meters 3a, 3b, and 3c may be collectively referred to as the smart meter 3. The number of power generators 4a, 4b, and 4c may be one or three or more, for example, depending on the number of producers. Hereinafter, the power generators 4a, 4b, and 4c may be collectively referred to as the power generator 4.

The number of intermediary servers 5 may be two or more, for example, depending on the number of intermediary agents. Further, the intermediary server 5 may be implemented by a single computer or a plurality of computers. The number of electric devices 8 may be two or more, for example, depending on the number of consumers.

As illustrated in FIG. 1, the tracking system 1 that resides on a data communication network includes the plurality of smartphones 2a, 2b, and 2c, the plurality of smart meters 3a, 3b, and 3c, the plurality of power generators 4a, 4b, and 4c, the intermediary server 5, and a plurality of nodes 9a, 9b, 9c, and 9d each implemented by such as a computer. Each of the nodes 9a, 9b, 9c, and 9d records transaction information (data) collectively in a unit called block, and manages items of information in the same block that may be distributed over the network. That is, the nodes 9a, 9b, 9c, and 9d share the same transaction information. In this embodiment, the nodes 9a, 9b, 9c, and 9d form a blockchain network 90. The blockchain network 90 is formed on the communication network 100 such as the Internet. The communication network 100 includes the Internet, a mobile communication network, a local area network (LAN), and the like. The communication network 100 may include not only wired communication network but also wireless communication network such as mobile communication system (4G, 5G, 6G, etc.) and Worldwide Interoperability for Microwave Access (WiMAX). Although there are actually a large number of nodes exist, only four nodes 9a, 9b, 9c, and 9d are illustrated in the figure for simplicity. In this exemplary embodiment, the nodes 9a, 9b, 9c, and 9d are managed by different organizations such as different companies, which may reside in one or more countries. The intermediary agent Da may be any one of these different organizations. For example, the intermediary server 5 and any one of the nodes 9a, 9b, 9c, and 9d may be managed by the same organization. Hereinafter, the nodes 9a, 9b, 9c, and 9d may be collectively referred to as the node 9.

Next, the terminals and devices of the producers Aa and Ab and the consumer Ca are described.

Terminals and Devices of Producer Aa

The smartphone 2a communicates data with the smart meter 3a by short-range wireless technology such as Near Field Communication (NFC) or BLUETOOTH. Further, the smartphone 2a communicates data with the intermediary server 5 via the communication network 100.

The smart meter 3a communicates data with the intermediary server 5 via the communication network 100. Further, the smart meter 3a measures an amount of electricity produced by the power generator 4a every predetermined time period (for example, every 30 minutes). The smart meter 3a performs processing such as requesting the node 9 of the blockchain network 90 to generate asset information indicating the amount of asset that can be provided such as electric power and the ownership of such asset.

The power generator 4a is a device that generates electricity from solar light.

Terminals and Devices of Producer Ab

The smartphone 2b communicates data with the smart meter 3b by short-range wireless technology such as NFC or BLUETOOTH. Further, the smartphone 2b communicates data with the intermediary server 5 via the communication network 100.

The smart meter 3b communicates data with the intermediary server 5 via the communication network 100. Further, the smart meter 3b measures an amount of electricity produced by the power generator 4b every predetermined time period (for example, every 30 minutes). The smart meter 3b performs processing such as requesting the node 9 of the blockchain network 90 to generate asset information indicating the amount of asset that can be provided such as electric power and the ownership of such asset.

The power generator 4b is a device that generates electricity from oil.

Terminals and Devices of Consumer Ca

The smartphone 2c communicates data with the smart meter 3c by short-range wireless technology such as NFC or BLUETOOTH. Further, the smartphone 2c communicates data with the intermediary server 5 via the communication network 100.

The smart meter 3c communicates data with the intermediary server 5 via the communication network 100. Further, the smart meter 3c measures an amount of electricity consumed by the electric device 8 every predetermined time period (for example, every 30 minutes). The smart meter 3c performs processing such as transmitting usage information indicating the amount of electricity consumed, and a duration of time when electricity is consumed, etc., to the intermediary server 5 via the communication network 100. Further, the smart meter 3c measures an amount of electricity produced by the power generator 4c every predetermined time period (for example, every 30 minutes). The smart meter 3c performs processing such as requesting the node 9 of the blockchain network 90 to generate asset information indicating the amount of asset that can be provided such as electric power and the ownership of such asset. Specifically, the smart meter 3c measures both an amount of electricity that is consumed, and an amount of electricity that is supplied.

To access the blockchain network 90 on behalf of the smart meter 3c, the intermediary server 5 previously stores, in the storage unit 5000, a certificate of the consumer Ca that is required to access the blockchain network 90.

The electric device 8 is any device that is operated with electricity produced by the consumer Ca, and/or electricity supplied by the consumers Aa and/or Ab.

Intermediary Server of Intermediary Agent Da

The intermediary server 5 intermediates transaction of asset (that is, asset information) between a supplier and a user. Specifically, the intermediary agent intermediates ownership of asset between the supplier and the user. In this disclosure, the example case in which the asset, which is an item, is electricity is described. To facilitate transaction of asset, the intermediary server 5 communicates data with each smartphone 2 (as the user) and each smart meter 3 (as the supplier) via the communication network 100. Further, the intermediary server 5 accesses the blockchain network 90 to enable tracking of transaction of asset. In example operation, the intermediary server 5 accesses the node 9 of the blockchain network 90 to communicate data with the node 9. In the example case of asset being electricity, the tracking system 1 tracks electricity from the supplier to the user.

The smartphones 2a and 2b are examples of communication terminals of the suppliers. The smartphone 2c is an example of a communication terminal of the user. Examples of communication terminal also include smart watches, PCs, and smart glasses. The smart meter 3 is an example of a measurement terminal.

Hardware Configuration

Figure 2:
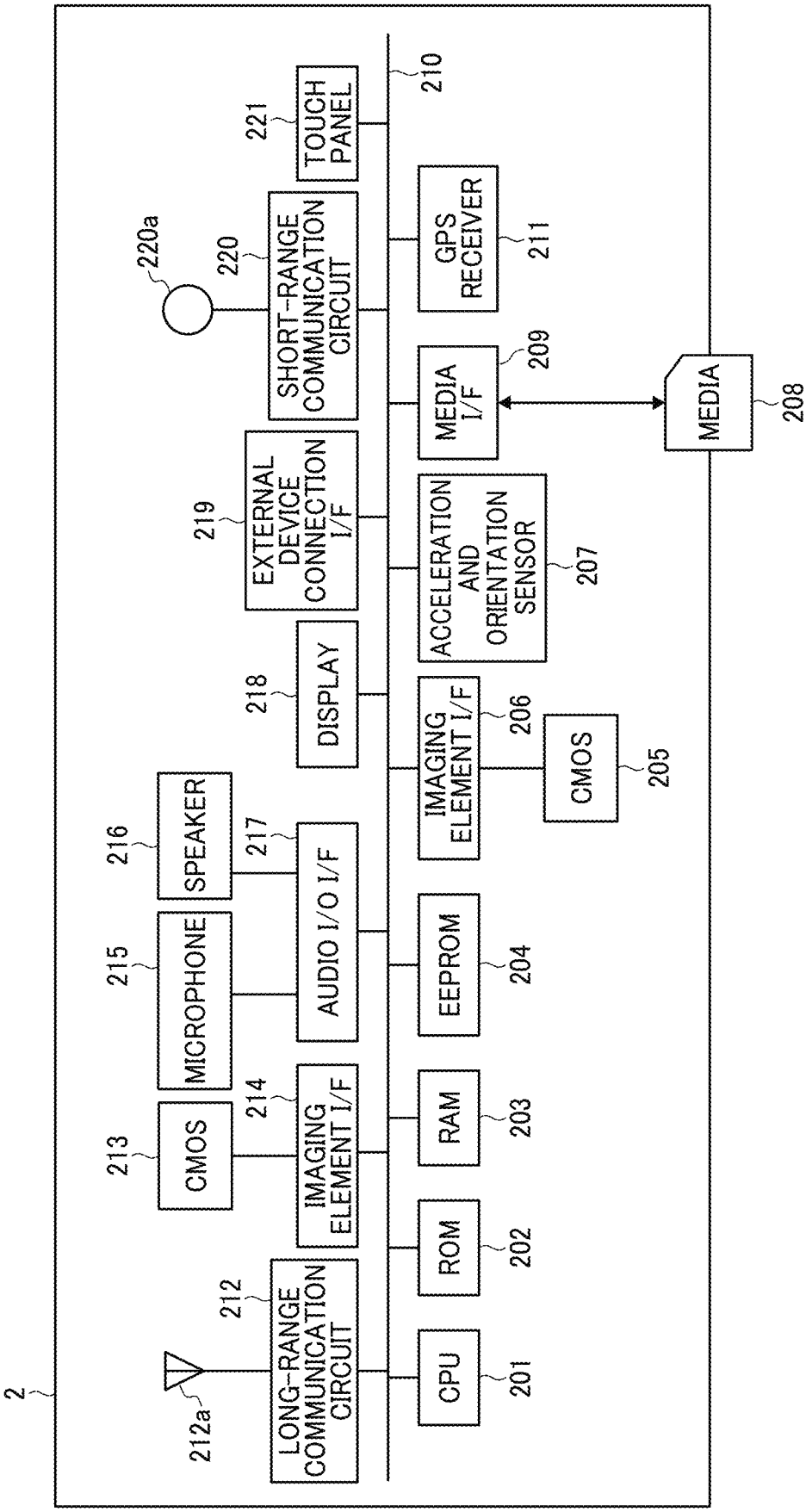
FIG. 2 is a schematic diagram illustrating a hardware configuration of a smartphone according to the exemplary embodiment.
Figure 3:
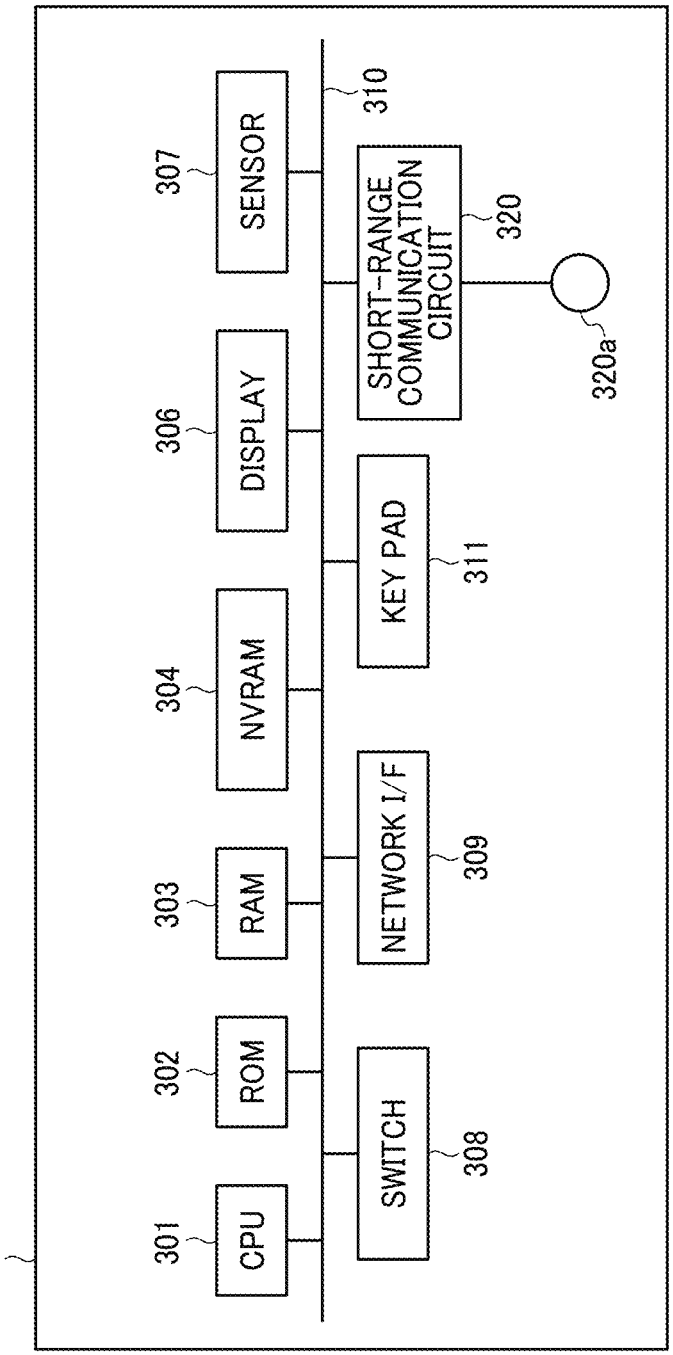
FIG. 3 is a schematic diagram illustrating a hardware configuration of a smart meter according to the exemplary embodiment.
Figure 4:
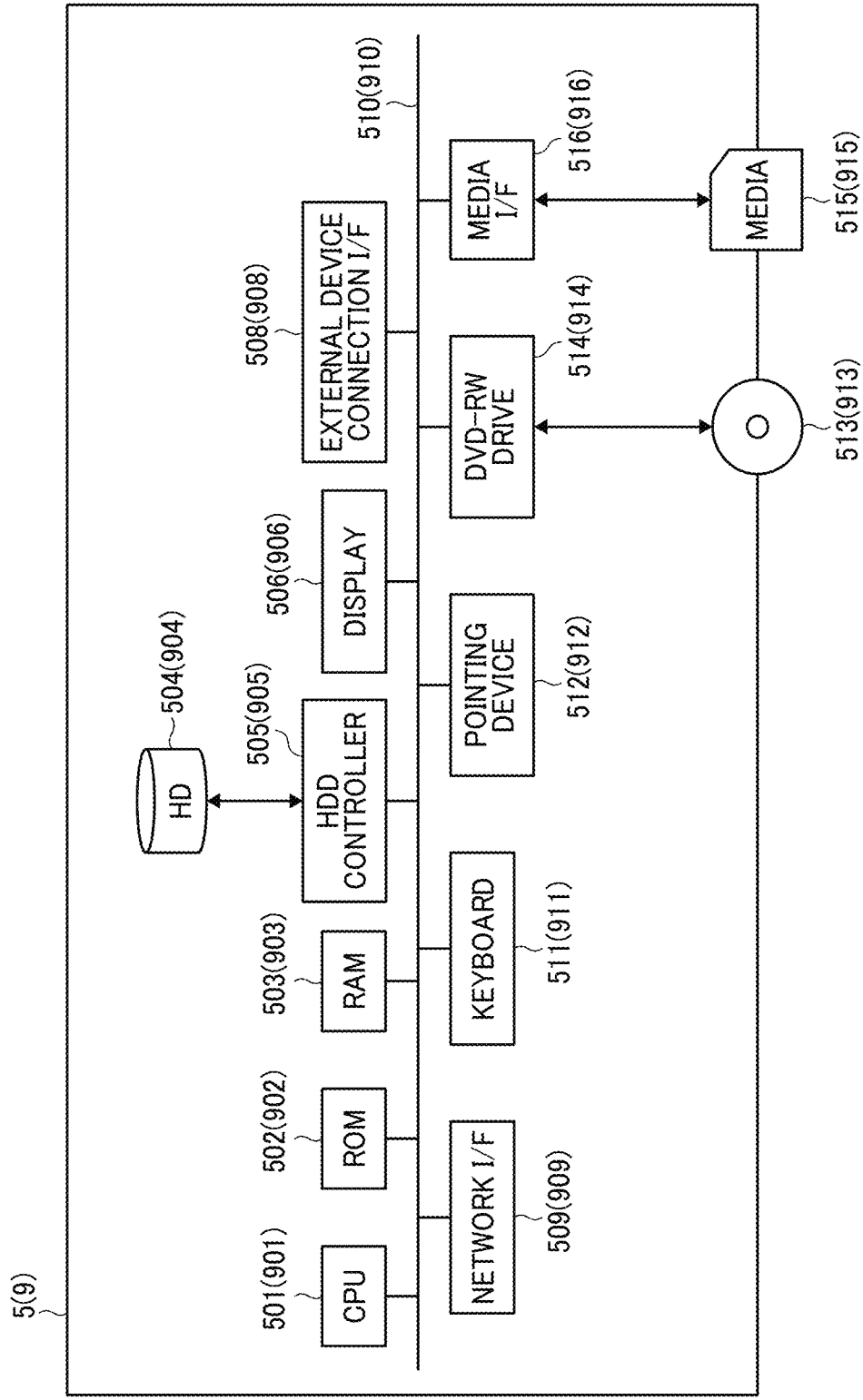
FIG. 4 is a schematic diagram illustrating a hardware configuration of an intermediary server according to the exemplary embodiment.

Next, referring to FIGS. 2 to 4, hardware configurations of the smartphone 2, the smart meter 3, the intermediary server 5, and the node 9 are described according to the embodiment.

Hardware Configuration of Smartphone

FIG. 2 is a schematic diagram illustrating a hardware configuration of a smartphone according to the exemplary embodiment. As illustrated in FIG. 2, the smartphone 2 includes a central processing unit (CPU) 201, read only memory (ROM) 202, random access memory (RAM) 203, Electrically Erasable Programmable ROM (EEPROM) 204, Complementary Metal Oxide Semiconductor (CMOS) sensor 205, image element interface (I/F) 206, acceleration and orientation sensor 207, media I/F 209, and Global Positioning System (GPS) receiver 211.

The CPU 201 controls entire operation of the smartphone 2. The ROM 202 stores a control program for controlling the CPU 201, such as an initial program loader (IPL). The RAM 203 is used as a work area for the CPU 201. The EEPROM 204 reads or writes various data such as a control program for a smartphone under control of the CPU 201. The CMOS sensor 205 is an example of a built-in imaging device that captures an object (mainly, a self-image of a user operating the smartphone 2) under control of the CPU 201 to obtain image data. In alternative to the CMOS sensor 205, an imaging element such as a charge-coupled device (CCD) sensor can be used. The imaging element I/F 206 is a circuit that controls driving of the CMOS sensor 205. The acceleration and orientation sensor 207 includes various sensors such as an electromagnetic compass or gyrocompass for detecting geomagnetism and an acceleration sensor. The media I/F 209 controls reading and writing (storing) of data from and to a storage medium (media) 208 such as a flash memory. The GPS receiver 211 receives a GPS signal from a GPS satellite.

The smartphone 2 further includes a long-range communication circuit 212, a CMOS sensor 213, an imaging element I/F 214, a microphone 215, a speaker 216, an audio input/output I/F 217, a display 218, an external device connection I/F 219, a short-range communication circuit 220, an antenna 220a for the short-range communication circuit 220, and a touch panel 221.

The long-range communication circuit 212 is a circuit that enables the smartphone 2 to communicate with other device through the communication network 100. The CMOS sensor 213 is an example of a built-in imaging device that captures an object under control of the CPU 201 to obtain image data. The imaging element I/F 214 is a circuit that controls driving of the CMOS sensor 213. The microphone 215 is a built-in circuit that converts audio into an electric signal. The speaker 216 is a built-in circuit that generates audio such as music or voice by converting an electric signal into physical vibration. The audio input/output I/F 217 is a circuit for inputting or outputting an audio signal between the microphone 215 and the speaker 216 under control of the CPU 201. The display 218 is an example of a display device that displays an image of the object, various icons, etc. Examples of the display 218 include a liquid crystal display (LCD) and an organic electroluminescence (EL) display. The external device connection I/F 219 is an interface that connects the smartphone 2 to various external devices. The short-range communication circuit 220 is a communication circuit that communicates in compliance with the near field communication (NEC), the BLUETOOTH, and the like. The touch panel 221 is an example of an input device that allows a user to operate the smartphone 2 by touching a screen of the display 218.

The smartphone 2 further includes a bus line 210. The bus line 210 is an address bus or a data bus, which electrically connects the components, illustrated in FIG. 2 such as the CPU 201.

Hardware Configuration of Smart Meter

FIG. 3 is a schematic diagram illustrating an example of hardware configuration of the smart meter. As illustrated in FIG. 3, the smart meter 3 is provided with a computer. Still referring to FIG. 3, the smart meter 3 includes a CPU 301, ROM 302, RAM 303, non-volatile RAM (NVRAM) 304, display 306, measurement sensor 307, switch 308, network I/F 309, keypad 311, touch panel 312, short-range communication circuit 320, and antenna 320a for the short-range communication circuit 320.

The CPU 301 controls entire operation of the smart meter 3. The ROM 302 stores a control program for executing the CPU 301 such as an IPL. The RAM 303 is used as a work area for the CPU 301. The NVRAM 304 is a non-volatile memory that stores and reads various data such as the control program. The display 306 displays various information such as a cursor, a menu, a window, a character, or an image.

The measurement sensor 307 measures electricity provided or consumed by the smart meter 3. The switch 308 is turned on to close, or turned off to open, the connections in an electric circuit to cause the electric current flow or stop in the electric circuit in the smart meter 3.

The network I/F 309 is an interlace for communicating data via the communication network 100 including the blockchain network 90 such as the Internet. The keypad 311 is an example of input device provided with a plurality of keys for inputting or selecting characters, numerals, or various instructions. The short-range communication circuit 320 is a communication circuit that enables communication based on short-range wireless technology such as NFC and BLUETOOTH. The bus line 310 is an address bus or a data bus, which electrically connects the components illustrated in FIG. 3 such as the CPU 301.

Hardware Configuration of Intermediary Server

FIG. 4 is a schematic diagram of a hardware configuration of the intermediary server according to the exemplary embodiment. Hardware components of the intermediary server 5 are designated by reference numerals in 500 series. As illustrated in FIG. 4, the intermediary server 5 is implemented by a computer. Specifically, the intermediary server 5 of FIG. 4 includes a CPU 501, ROM 502, RAM 503, hard disk (HD) 504, hard disk drive (HDD) controller 505, display 506, external device connection I/F 508, network I/F 509, bus line 510, keyboard 511, pointing device 512, Digital Versatile Disk Rewritable (DVD-RW) drive 514, and media 516.

The CPU 501 controls entire operation of the intermediary server 5. The ROM 502 stores a control program for executing the CPU 501, such as an IPL. The RAM 503 is used as a work area for the CPU 501. The HD 504 stores various data such as the control program. The HDD controller 505 controls reading or writing of various data with respect to the HD 504 under control of the CPU 501. The display 506 displays various information such as cursors, menus, windows, characters, or images. The external device connection I/F 508 is an interface that connects the intermediary server 5 to various external devices. Examples of the external devices include, but not limited to, a universal serial bus (USB) memory and a printer. The network I/F 509 is an interface that controls communication of data with an external device through the communication network 100. The bus line 510 is an address bus, a data bus or the like, which electrically connects the elements illustrated in FIG. 4 such as the CPU 501.

The keyboard 511 is one example of an input device provided with a plurality of keys for allowing a user to input characters, numerals, or various instructions. The pointing device 512 is an example of an input device that allows a user to select or execute various instructions, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or Blu-ray Disc. The media I/F 516 controls reading and writing (storing) of data from and to a storage medium (media) 515 such as a flash memory.

Hardware Configuration of Node

FIG. 4 is a schematic diagram also illustrating an example of hardware configuration of the node. Hardware components of the node 9 are designated by reference numerals in 900 series. As illustrated in FIG. 4, since the node 9, which is implemented by a computer, has the same configuration as the intermediary server 5, description of hardware configuration thereof is omitted.

Functional Configuration

Figure 5:
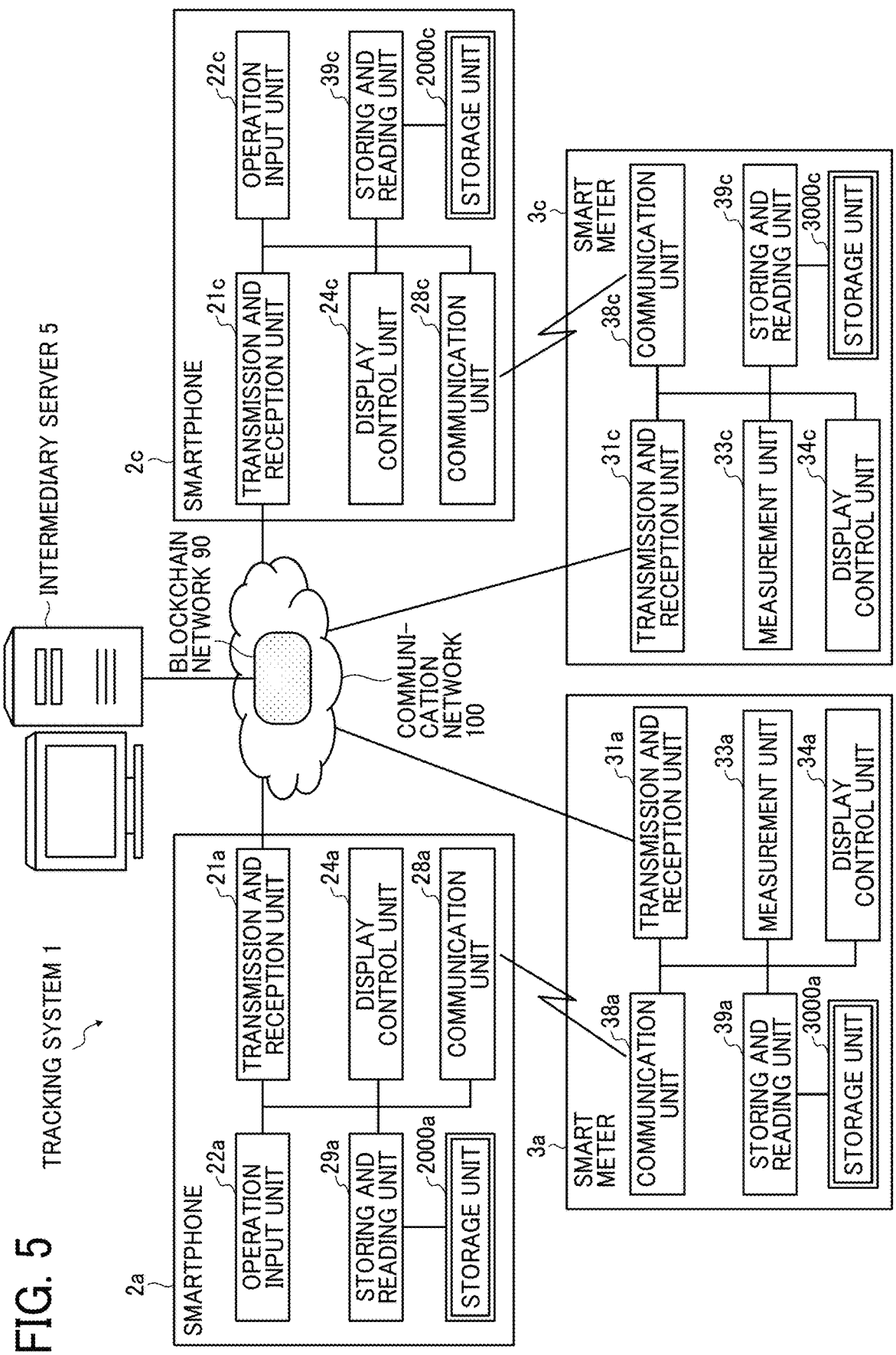
FIG. 5 is a schematic block diagram illustrating functional configurations of the smartphone and the smart meter in the tracking system of FIG. 1, according to the exemplary embodiment.

Next, referring to FIGS. 5 to 8, a functional configuration of each terminal and device of the tracking system 1 is described according to the exemplary embodiment. FIG. 5 is a schematic block diagram illustrating an example functional configuration of the smartphone and the smart meter in the tracking system.

Functional Configuration of Smartphone 2a

As illustrated in FIG. 5, the smartphone 2a includes a transmission and reception unit 21a, an operation input unit 22a, a display control unit 24a, a communication unit 28a, and a storing and reading unit 29a. These units are caused to function by operating one or more hardware components illustrated in FIG. 2 in cooperation with instructions of the CPU 201 according to the control program for smartphone loaded from the EEPROM 204 to the RAM 203.

Further, the smartphone 2a includes a storage unit 2000a implemented by the ROM 202, the RAM 203, and the EEPROM 204 illustrated in FIG. 2.

Each Functional Element of the Smartphone 2a

The transmission and reception unit 21a of the smartphone 2a, which is implemented mainly by instructions of the CPU 201 with respect to the long-range communication circuit 212, controls transmission or reception of various data (or information) to or from other device (for example, the intermediary server 5) via the communication network 100.

The operation input unit 22a, which is mainly implemented by instructions of the CPU 201 with respect to the touch panel 221, receives various selections or inputs from the user.

The display control unit 24a, which is mainly implemented by instructions of the CPU 201, controls the display 218 to display various images. The display control unit 24a further provides a web browser function.

The communication unit 28a, which is mainly implemented by instructions of the CPU 201 with respect to the short-range communication circuit 220, communicates various data with a communication unit 38a, to be described later, of the smart meter 3a. In the case of wired communication, the smartphone 2 is connected to the smart meter 3a via a communication cable to communicate data.

The storing and reading unit 29a, which is mainly implemented by instructions of the CPU 201, stores various data (or information) in the storage unit 2000a and reads various data (or information) from the storage unit 2000a.

Functional Configuration of Smartphone 2c

As illustrated in FIG. 5, the smartphone 2c includes a transmission and reception unit 21c, an operation input unit 22c, a display control unit 24c, a communication unit 28c, and a storing and reading unit 29c. These units are caused to function by operating one or more hardware components illustrated in FIG. 2 in cooperation with instructions of the CPU 201 according to the control program for smartphone loaded from the EEPROM 204 to the RAM 203.

Further, the smartphone 2c includes a storage unit 2000c implemented by the ROM 202, the RAM 203, and the EEPROM 204 illustrated in FIG. 2.

The respective units of the smartphone 2c (transmission and reception unit 21c, operation input unit 22c, display control unit 24c, communication unit 28c, and storing and reading unit 29c) are substantially the same in function to corresponding units of the smartphone 2a (transmission and reception unit 21a, operation input unit 22a, display control unit 24a, communication unit 28a, and storing and reading unit 29a), so that description thereof is omitted.

Similarity to the smartphone 2c, the smartphone 2b is substantially the same in function to the smartphone 2a, but FIG. 5 omits the smartphone 2b as the smartphone 2b is not referred below.

Functional Configuration of Smart Meter 3a

As illustrated in FIG. 5, the smart meter 3a includes a transmission and reception unit 31a, a measurement unit 33a, a display control unit 34a, a communication unit 38a, and a storing and reading unit 39a. These units are caused to function by operating one or more hardware components illustrated in FIG. 3 in cooperation with instructions of the CPU 301 according to the control program for smart meter loaded from the NVRAM 304 to the RAM 303.

Further, the smart meter 3a includes a storage unit 3000a implemented by the ROM 302, the RAM 303, and the NVRAM 304 illustrated in FIG. 3.

Each Functional Element of the Smart Meter 3a

The transmission and reception unit 31a of the smart meter 3a, which is implemented mainly by instructions of the CPU 301 with respect to the network I/F 309, controls transmission or reception of various data (or information) to or from other device (for example, the intermediary server 5) via the communication network 100.

The measurement unit 33a, which is implemented mainly by instructions of the CPU 301 with respect to the measurement sensor 307, measures the amount of electricity generated by the power generator 4a.

The display control unit 34a, which is mainly implemented by the instructions of the CPU 301, controls the display 306 to display various images.

The communication unit 38a, which is mainly implemented by the instructions of the CPU 301 with respect to the short-range communication circuit 320, communicates various data with the communication unit 28a of the smartphone 2a. In the case of wired communication, the smartphone 2 is connected to the smart meter 3a via a communication cable to communicate data.

The storing and reading unit 39a, which is mainly implemented by instructions of the CPU 301, stores various data (or information) in the storage unit 3000a and reads various data (or information) from the storage unit 3000a.

Functional Configuration of Smart Meter 3c

As illustrated in FIG. 5, the smart meter 3c includes a transmission and reception unit 31c, a measurement unit 33c, a display control unit 34c, a communication unit 38c, and a storing and reading unit 39c. These units are caused to function by operating one or more hardware components illustrated in FIG. 3 in cooperation with instructions of the CPU 301 according to the control program for smart meter loaded from the NVRAM 304 to the RAM 303.

Further, the smart meter 3a includes a storage unit 300c implemented by the ROM 302, the RAM 303, and the NVRAM 304 illustrated in FIG. 3.

The respective units of the smart meter 3c (transmission and reception unit 31c, measurement unit 33c, display control unit 34c, communication unit 38c, and storing and reading unit 39c) are substantially the same in function to corresponding units of the smart meter 3a (transmission and reception unit 31a, measurement unit 33a, display control unit 34a, communication unit 38a, and storing and reading unit 39a), so that description thereof is omitted.

Similarly to the smart meter 3c, the smart meter 3b is substantially the same in function to the smart meter 3a, but FIG. 5 omits the smart meter 3b as the smart meter 3b is not referred in the following description.

Functional Configuration of Intermediary Server 5

For simplicity, FIG. 6 also illustrates a block diagram of a functional configuration of the intermediary server 5. FIG. 6 is a schematic block diagram illustrating a functional configuration of the intermediary server and the node in the tracking system according to the exemplary embodiment. As illustrated in FIG. 6, the intermediary server 5 includes a transmission and reception unit 51, an asset determination unit 53, a display control unit 54, a determination unit 55, a creation unit 58, and a storing and reading unit 59. These units are caused to function by operating one or more hardware components illustrated in FIG. 4 in cooperation with instructions of the CPU 501 according to the control program for the intermediary server loaded from the HD 504 to the RAM 503.

Further, the intermediary server 5 includes a storage unit 5000 implemented by the ROM 502 and the HD 504 illustrated in FIG. 4.

User Management Table

FIG. 7A is a conceptual diagram illustrating an example of user management table. The user management table is a table used by the intermediary agent Da to manage information on each user such as a consumer of electricity. Specifically, the storage unit 5000 includes a user management DB 5001, such as a user management table as illustrated in FIG. 7A. The user management table stores, for each user, a user ID, a user name, a user's address (or location where the user resides), and a selectable supplier ID in association.

Of these items, the user ID is an example of user identification formation for identifying the user of an asset, such as the consumer Ca of electricity. The selectable supplier ID is an example of supplier identification information for identifying a supplier, such as a producer or electricity, which can be selected by the user identified with the user ID. For example, if the user's address is in Tokyo, the selectable suppliers are limited to those suppliers that have addresses in or around Tokyo.

Supplier Management Table

FIG. 7B is a conceptual diagram illustrating an example of supplier management table. The supplier management table is a table used by the intermediary agent Da to manage each supplier such as a producer of electricity. The storage unit 5000 stores a supplier management DB 5002, which is implemented by the supplier management table as illustrated FIG. 7B. The supplier management table includes, for each supplier, a supplier ID, a supplier name, an asset (such as electricity) production method of the supplier, and an amount of asset that can be supplied from the supplier, in association.

Of these items, the supplier ID is an example of supplier identification information for identifying the supplier of asset such a producer of electricity. The production method is determined based on a type of energy resource used to produce the asset (electricity). As described above, examples of production method include a production method using solar (solar light or solar heat), a production method using wind power, a production method using biomass, a production method using geothermal power, a production method using hydroelectric power, a production method using oil, a production method using coal, and a production method using liquefied natural gas. The above-described production methods may be classified into one or more groups, such as the group of production methods using renewable energy or the group of production methods using conventional energy such as fossil fuel. The amount that can be supplied is an amount of assets that can be supplied by a supplier for a certain time period. In case the supplier is a producer of electricity, the amount that can be supplied is an amount of electric energy that can be supplied for a unit of time (here, one hour) (kWh).

Usage Plan Management Table

FIG. 8A is a conceptual diagram illustrating an example of usage plan management table. The usage plan management table is a table used for managing information on planned usage of asset, set by the user such as the consumer Ca. The storage unit 5000 includes a usage plan management DB 5003, which is implemented by the usage plan management table as illustrated in FIG. 8A. The usage plan management table includes information on details of usage that the user previously sets for future. Here, the example case in which the asset is electricity is described. Specifically, the usage plan management table includes a user ID of a user, usage start date, usage end date, planned usage amount (planned consumption), renewable energy usage ratio, supplier ID of a supplier, a supplier name of the supplier, and production method of asset, in association. The same data items stored both in the tables of FIGS. 7A and 7B, such as the user ID, are each designated with the same item name.

Of these, the usage start date is information indicating the date when the user such as the consumer Ca starts using the asset such as electricity. The usage end date is information indicating the date when the user ends using the asset such as electricity. The planned usage amount is the amount of asset that the user plans to use for a certain time period, and can be expressed in terms of electric energy (kWh). The renewable energy usage ratio is information indicating a ratio (%) of assets (electricity) produced from renewable energy such as solar light, with respect to total amount of assets (electricity) to be used by the user such as the consumer Ca during a certain time period such as a period between the start date and the end date.

Usage History Management Table

FIG. 8B is a conceptual diagram illustrating an example of usage history management table. The usage history management table is a table for managing a history (log) of usage of asset that the intermediary server 5 transfers its ownership from the supplier to the user. The storage unit 5000 includes a usage history management DB 5004, such as the usage history management table as illustrated in FIG. 8B for each user. The usage history management table manages usage history information, specifically, the usage date and time, the usage amount, the production method of asset in use, and the total (accumulated) usage amount by production method, in association. Specifically, in this disclosure, the usage history management table manages a log of electricity consumption for each user by production method. From this perspective, the usage history management table of FIG. 8B indicates the date and time of electricity consumption, the amount of electricity consumption, the production method of electricity being consumed, and the total amount of electricity consumption by production method. The production method is determined based on a type of resource (such as an energy resource) used to produce asset (such as electricity). For example, when the asset is electricity, one example of production method corresponds to one or more processes of producing electricity from solar such as solar light using various technologies. Although this embodiment describes a case in which one production method uses solar light and another production method uses oil, any other type of production method (for example, production method using wind power or production method using coal) may be used. Further, the above-described production methods may be classified into one or more groups, such as the group of production methods using renewable energy or the group of production methods using conventional energy such as fossil fuel.

Of the usage history information, the same data items stored in the tables of FIGS. 7A and 7B, such as the user ID, are each designated with the same item name. In this example, the usage date and time indicates the date and time when ownership of asset is transferred, specifically, the date and time when the intermediary server 5 transfers the ownership of the asset acquired from the supplier, such as the producer, to the user such as the consumer Ca. The usage amount indicates an amount of asset that the intermediary server 5 acquires its ownership from the supplier and provides the acquired ownership to the user. In this example case, the amount of asset, which is electricity, is represented by, for example, electric energy (kWh). The total usage amount indicates a total amount of assets, which are produced by a specific production method and allocated to a user such as the consumer Ca for a certain period of time, and is expressed in total electric energy (kWh), for example. Before transfer of ownership of asset, the intermediary server 5 refers to a record of the user in the usage history management DB 5004 to determine a production method of asset to be allocated to the user such as the consumer Ca. For example, when the renewable energy usage ratio set by the consumer Ca is 40% as illustrated in FIG. 8A, the intermediary server 5 refers to the total usage amount for solar in the usage history management DB 5004, to determine a production method of asset to be provided to the consumer Ca.

In this example, since the planned usage amount (for example, 20 kWh) illustrated in FIG. 8A is a planned usage amount for every hour, the usage amount will be half the planned usage amount (for example, 10 kWh), when transferring the ownership of asset is performed every 30 minutes as illustrated in FIG. 8B.

Although this embodiment describes a case in which one production method uses solar light and another production method uses oil, any other type of production method (for example, production method using wind power or production method using coal) may be used. Further, the above-described production methods may be classified into one or more groups, such as the group of production methods using renewable energy or the group of production methods using conventional energy such as fossil fuel.

Furthermore, the production method may be determined based on a type of asset production process. When any one of processes in producing the asset such as electricity differs, the asset production processes are different, such that the production methods differ from each other. In one example, even when the same energy resource, such as solar, is used to produce electricity, if different technologies used for producing electricity (such as one using solar light and other using solar heat) differ, the resultant processes are different such that they belong to different production methods. In another example, if different machines are used or not used (such as a case when a turbine is used, or not used, to produce electricity), the resultant processes are different such that they belong to different production methods.

Each Functional Unit of Intermediary Server

Next, each function unit of the intermediary server 5 is described in detail with reference to FIG. 6, according to the exemplary embodiment. The transmission and reception unit 51 of the intermediary server 5, which is implemented mainly by instructions of the CPU 501 with respect to the network I/F 509, controls transmission or reception of various data (or information) to or from other device (for example, the smartphone 2a, 2c) via the communication network 100. The transmission and reception unit 51 also serves as a reception unit that receives the planned usage, described later, from the smartphone 2c.

The asset determination unit 53, which is implemented by the instructions of the CPU 501, determines asset information indicating an ownership of the asset (the asset that the intermediary server 5 intermediates transfer of ownership) to be transferred to the user. For example, it is assumed that the intermediary agent Da intermediates transfer of ownership of asset, produced by a specific type of production method, for the consumer Ca. In such case, the asset determination unit 53 determines asset information on such asset, based on "history of usage of asset produced by the specific type of production method for a specific user (customer Ca)" stored in the usage history management DB 5004, and "renewable energy usage ratio" stored in the usage plan management DB 5003. Specifically, when the renewable energy usage ratio for the consumer Ca is set to 40%, the asset determination unit 53 refers to the total usage amount of solar in the usage history management DB 5004, to determine to transfer ownership of asset produced from renewable energy, from the intermediary agent Da (managing the intermediary server 5) to the consumer Ca, until the renewable energy usage ratio reaches 40%.

The display control unit 54, which is mainly implemented by the instructions of the CPU 501, controls the display 506 to display various images, or controls the display 218 of the smartphone 2 to display various images via the communication network 100. In this case, the smartphone 2 displays various images using functions provided by the web browser of the display control unit 24 of the smartphone 2. The display control units 24a and 24c may be collectively referred to as the display control unit 24.

The determination unit 55, which is implemented by the instructions of the CPU 501, makes various determinations.

The creation unit 58, which is implemented by the instructions of the CPU 501, creates an application form to be submitted by the intermediary agent to the certification authority E, based on the transaction information and the asset information. This application form is a predetermined application form, which is used to apply for a production method certificate, certifying that the asset is produced by a certain type of production method.

The storing and reading unit 59, which is mainly implemented by the instructions of the CPU 501, stores various data (or information) in the storage unit 5000 and reads various data (or information) from the storage unit 5000.

Functional Configuration of Node 9

As illustrated in FIG. 6, the node 9 includes a transmission and reception unit 91, a verification unit 93, a determination unit 95, a transaction processing unit 96, an asset processing unit 97, and a storing and reading unit 99. These units are caused to function by operating one or more hardware components illustrated in FIG. 4 in cooperation with instructions of the CPU 901 according to the control program for the node loaded from the HD 904 to the RAM 903.

The node 9 further includes a storage unit 9000, which is implemented by the ROM 902 and the HD 904 illustrated in FIG. 4. For the descriptive purposes, FIG. 6 illustrates a state in which transaction information is connected like a chain. The node 9 further stores asset information generated based on the transaction information. The transaction information and the asset information are stored in each node.

Asset Generation Authority Management Table

FIG. 9 is a conceptual diagram illustrating an example of asset generation authority management table. The asset generation authority management table is used to manage authority to request generation of asset information and authority to request change of asset information. The storage unit 9000 includes an asset generation authority management DB 9001, implemented by an asset authority generation management table as illustrated in FIG. 9. The asset generation authority management table stores, for each type of a requester, information indicating whether the requester has authority to request generation of asset information, and information indicating whether the requester has authority to change asset information in association. In this example, types of requester, which may be referred to as attribute of requester, include a supplier, intermediary agent, consumer, and supplier and consumer. The contents of the asset generation authority management table are registered by the intermediary server 5 before transfer of ownership of asset starts.

For example, a supplier of asset such as the producer Aa or Ab has authority to request generation of asset information, but sloes not have authority to request change of asset information. Further, an intermediary agent such as the intermediary agent Da does not have authority to request generation of asset information, but has authority to request change of asset information. A user of asset such as the consumer has none of authority to request generation of asset information and authority to request change of asset information. Similarly to the supplier, the supplier and the user, such as the consumer Ca, has authority to request generation of asset information, but does not have authority to request change of asset information.

Functional Unit of Node

Next, each functional unit of the node 9 is described in detail with reference to FIG. 6. The transmission and reception unit 91 of the node 9, which is implemented mainly by instructions of the CPU 901 with respect to the network I/F 909, controls transmission or reception of various data (or information) to or from other node of the blockchain network 90 on the communication network 100. The transmission and reception unit 91 transmits or receives various data (or information) between the transmission and reception unit 31a of the smart meter 3a and the transmission and reception unit 51 of the intermediary server 5. Although the smart meter 3b is not illustrated in FIG. 6, the transmission and reception unit 91 actually transmits or receives various data (or information) to or from the smart meter 3b.

The verification unit 93, which is implemented by the instructions of the CPU 901, verifies the certificate and the supplier information. The certificate verification is a process of determining whether or not a target certificate is a certificate of the entity that is registered in advance in the node 9. The certificate verification further determines whether or not the entity (supplier, intermediary agent, or consumer) has an access right to the node 9. The verification of the supplier information is a process of determining whether or not all predetermined contents are entered in predetermined format (for example, whether the supplier is entered or the provision time period is entered).

The determination unit 95, which is implemented by the instructions of the CPU 901, makes various determinations.

The transaction processing unit 96, which is implemented by the instructions of the CPU 901, performs processing such as generating transaction information indicating a transaction causing generation of asset information and storing the transaction information in the storage unit 9000.

The asset processing unit 97, which is implemented by the instructions of the CPU 901, performs processing such as generating asset information according to the transaction information and storing the asset information in the storage unit 9000.

The storing and reading unit 99, which is mainly implemented by the instructions of the CPU 901, stores various data (or information) in the storage unit 9000 and reads various data (or information) from the storage unit 9000.

Processing or Operation

Next, referring to FIGS. 10 to 20, processing or operation performed by the tracking system is described according to the embodiment.

Registration of Intermediary Agent

Figure 10:
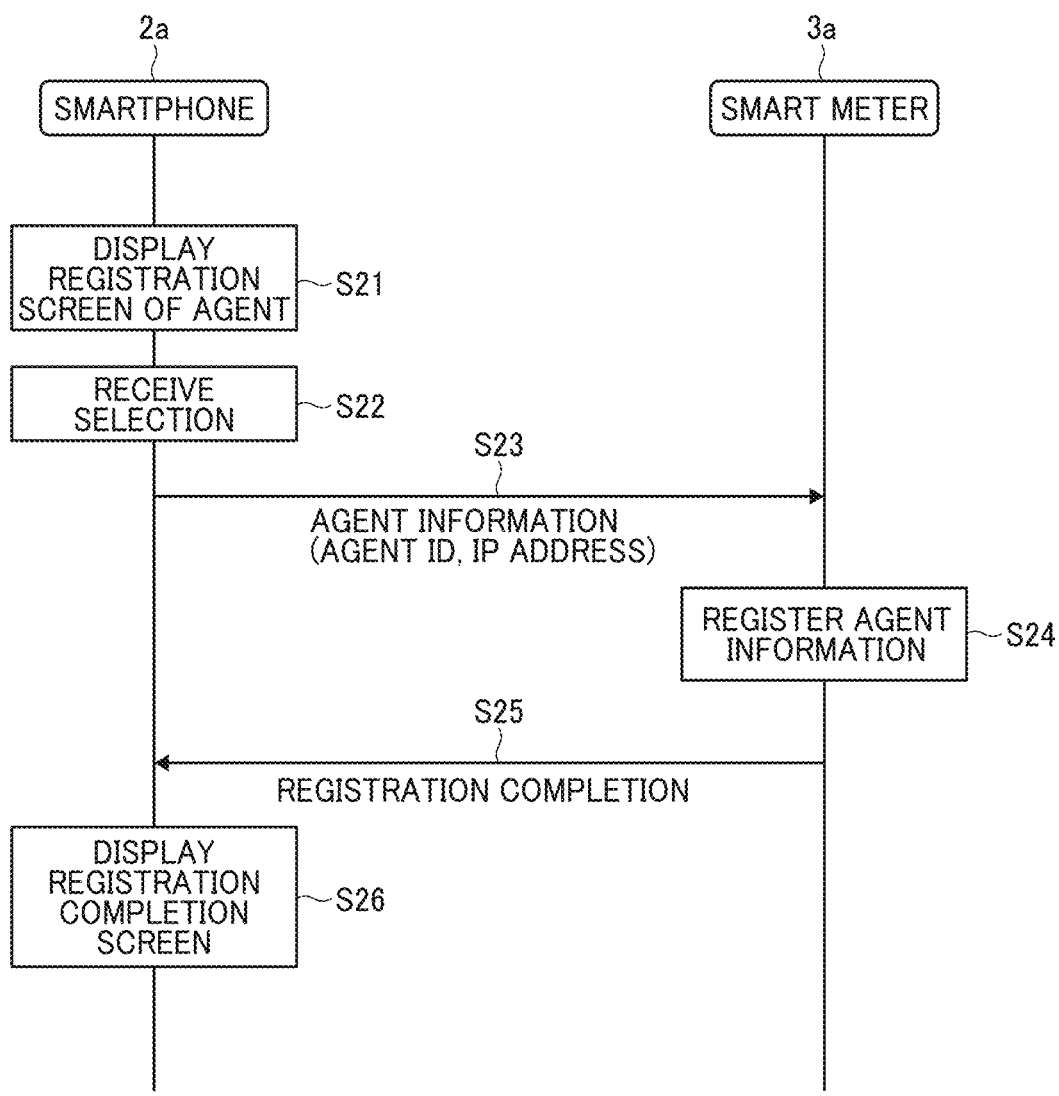
FIG. 10 is a sequence diagram illustrating example processing of registering intermediary agents.
Figure 11A:
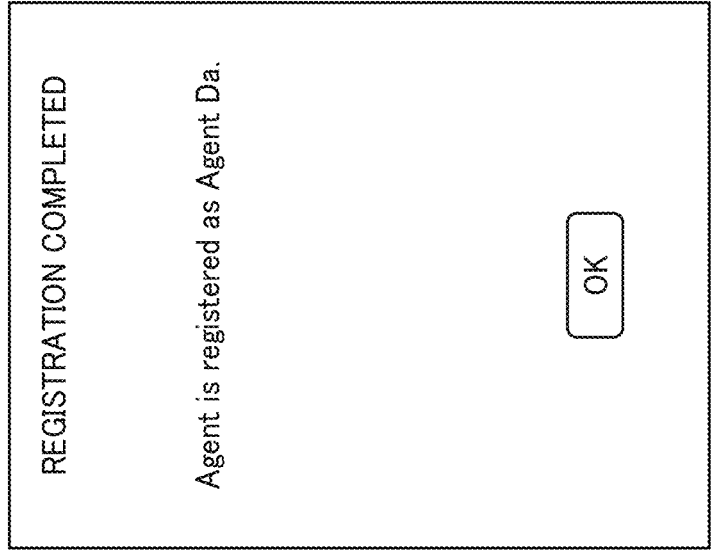
FIG. 11A is an illustration of an example intermediary agent registration screen.
Figure 11B:
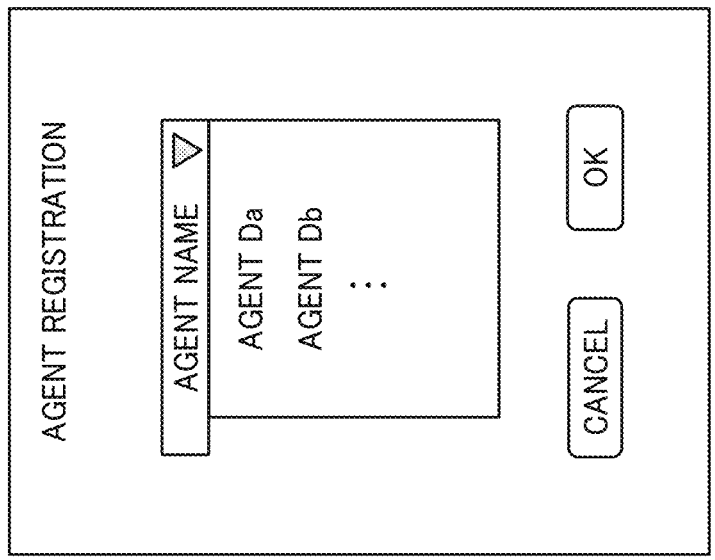
FIG. 11B is an illustration of an example intermediary agent registration completion screen.

Next, referring to FIGS. 10 and 11, processing of registering intermediary agents is described according to the exemplary embodiment. FIG. 10 is a sequence diagram illustrating example processing of registering intermediary agents. FIG. 11A is an illustration of an example intermediary agent registration screen. FIG. 11B is an illustration of an example intermediary agent registration completion screen. The following describes an example case in which the producer Aa registers the intermediary agent Da, from among a plurality of intermediary agents. It is assumed that the producer Aa previously makes a contract with the intermediary agent Da, such that the producer Aa is able to select the intermediary agent Da as described later. The smartphone 2a is installed with an application program that allows the producer Aa to register intermediary agents. This application program allows the smartphone 2a to obtain various information on each intermediary agent such as an intermediary agent ID for identifying the intermediary agent, a name of the intermediary agent, and an internet protocol (IP) address of an intermediary server of the intermediary agent, which are stored in association.

As illustrated in FIG. 10, at the smartphone 2a, the display control unit 24a controls the display 218 to display the intermediary agent registration screen illustrated in FIG. 11A (S21). The intermediary agent registration screen displays a pull-down menu, which lists a plurality of intermediary agent names to allow the producer Aa to select a particular intermediary agent. The intermediary agent registration screen further includes, at its lower part, an "OK" button to be pressed to confirm the intermediary agent name selected from the pull-down menu, and a "CANCEL" button to be pressed to cancel the selection.

When the producer Aa selects a desired intermediary agent name from the plurality of intermediary agent names and presses the "OK" button, the operation input unit 22a receives the selection on the intermediary agent (S22). Here, the case where the intermediary agent Da is selected is described.

After the operation input unit 22a receives the selection, the communication unit 28a transmits information on the selected intermediary agent to the communication unit 38a of the smart meter 3a by short-range wireless communication (S23). The intermediary agent information includes an intermediary agent ID for identifying the selected intermediary agent and an IP address of an intermediary server of the selected intermediary agent. Accordingly, the communication unit 38a of the smart meter 3a receives the intermediary agent information.

Next, at the smart meter 3a, the storing and reading unit 39a registers the intermediary agent information in the storage unit 3000a (S24). With this information on the registered agent, the smart meter 3a is able to communicate with the intermediary server 5 of the registered agent to request various processing. Then, the communication unit 38a transmits registration completion information indicating that registration of the intermediary agent is completed to the smartphone 2a (S25). Accordingly, the communication unit 28a of the smartphone 2a receives the registration completion information.

Next, at the smartphone 2a, the display control unit 24a controls the display 218 to display the registration completion screen as illustrated in FIG. 11B (S26). The registration completion screen displays a message indicating that registration of the intermediary agent is completed. The registration completion screen further includes an "OK" button to be pressed by the producer Aa to close the screen being displayed. When the producer Aa presses the "OK" button, the registration completion screen is closed.

The processing of registering the intermediary agent thus ends.

Processing of Registering Usage Plan

Next, referring to FIGS. 12 and 13, processing of registering usage plan is described according to the exemplary embodiment. FIG. 12 is a sequence diagram illustrating processing of registering planned usage of assets according to the embodiment. FIG. 13A is an illustration of an example usage plan registration screen before information is entered or selected. FIG. 13B is an illustration of an example usage plan registration screen after information is entered or selected. The following describes the example case in which the consumer Ca registers the planned usage of electricity, as an asset, to the intermediary server 5 using the smartphone 2c.

As illustrated in FIG. 12, the transmission and reception unit 21c of the smartphone 2c transmits a request for displaying a usage plan registration screen to the intermediary server 5 via the communication network 100 (S41). The display request includes a user ID for identifying the consumer Ca as a user who is the request source. Accordingly, the transmission and reception unit 51 of the intermediary server 5 receives the display request. The user ID is an example of user identification information. When the user is an individual, examples of the user identification information include any number for uniquely identifying an individual, which may be designated by a public institution such as a social security number in the U.S. and a my number in Japan, and a telephone number of the individual. When the user is an organization such as a company, examples of the user identification information include any number for uniquely identifying a company, such as a telephone number of the company.

Next, at the intermediary server 5, the storing and reading unit 59 searches the user management DB 5001 (see FIG. 7A) using the user ID received at S41 as a search key, to read out all selectable supplier IDs associated with the user ID (S42). Further, the storing and reading unit 59 searches the supplier management DB 5002 using each supplier ID read at S42 as a search key, to read out various information on each supplier (supplier name, production method, and amount that can be supplied) (S43). The display control unit 54 generates a usage plan registration screen as illustrated in FIG. 13A based on the information on each supplier read at S43 (S44). Accordingly, at the smartphone 2c, the display control unit 24c uses its web browser function to display, on the display 218 of the smart phone 2c, the usage plan registration screen illustrated in FIG. 13A that is generated by the intermediary server 5 (S45). The usage plan registration screen includes a plurality of fields for entering usage start date, usage end date, planned usage amount, and renewable energy usage ratio, and a plurality of check boxes each for selecting a supplier of the asset. The asset, in this case, is electricity. The usage plan registration screen further includes, at its bottom, an "OK" button to be pressed to confirm the usage plan such as the entered items of the input fields and the checked boxes, and a "CANCEL" button to be pressed to cancel all the usage plans having been entered.

Here, the consumer Ca operates the touch panel of the smartphone 2c to enter any desired numerical value in each input field. The consumer Ca further checks a check box of any desired supplier. When the consumer Ca presses the "OK" button, the operation input unit 22c receives the entered and checked items as the usage plan (S46). The renewable energy usage ratio indicates a ratio of renewable energy to total energy, which is planned to be used to produce electricity that the consumer Ca wants to acquire.

Here, the consumer Ca selects the producer Aa that produces electricity from solar light as energy. However, since the producer Aa does not produce any electricity at night, the consumer Ca additionally selects the producer Ab that produces electricity from oil. The renewable energy usage ratio is set to 40%.

Next, the transmission and reception unit 21c of the smartphone 2c transmits usage plan information indicating the entered and selected items to the intermediary server 5 via the communication network 100 (S47). Accordingly, the transmission and reception unit 51 of the intermediary server 5 receives the usage plan information.

Next, at the intermediary server 5, the storing and reading unit 59 stores, in the usage plan management DB 5003 (see FIG. 8A), the usage plan information received at S47 in association with the user ID received at S41 (S48).

The processing of registering usage plan thus ends.

Processing of Setting the Intermediary Agent as an Owner of the Asset

Figure 14:
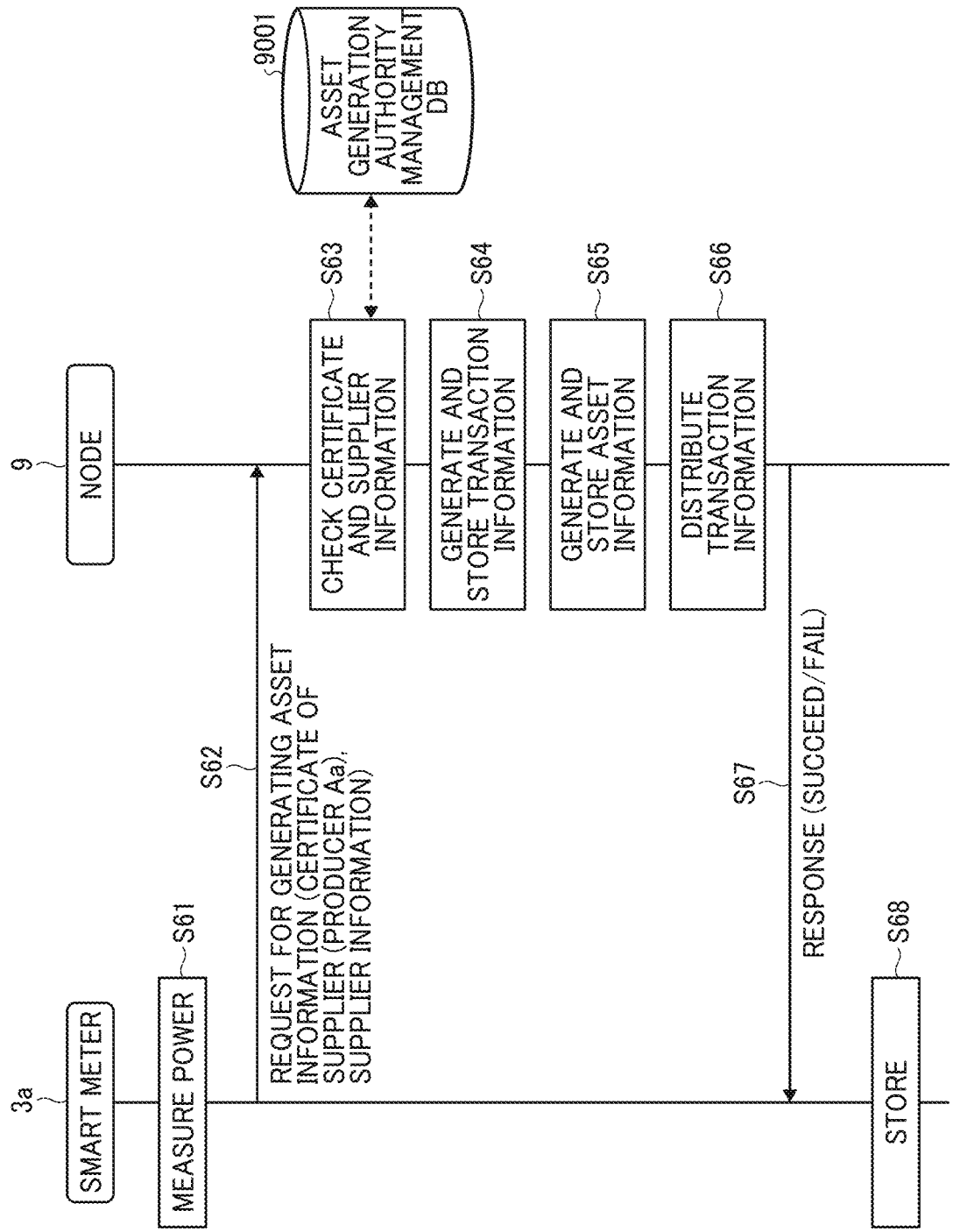
FIG. 14 is a sequence diagram illustrating processing of setting the intermediary agent as an owner of the asset provided by the supplier, according to the embodiment.
Figure 15:
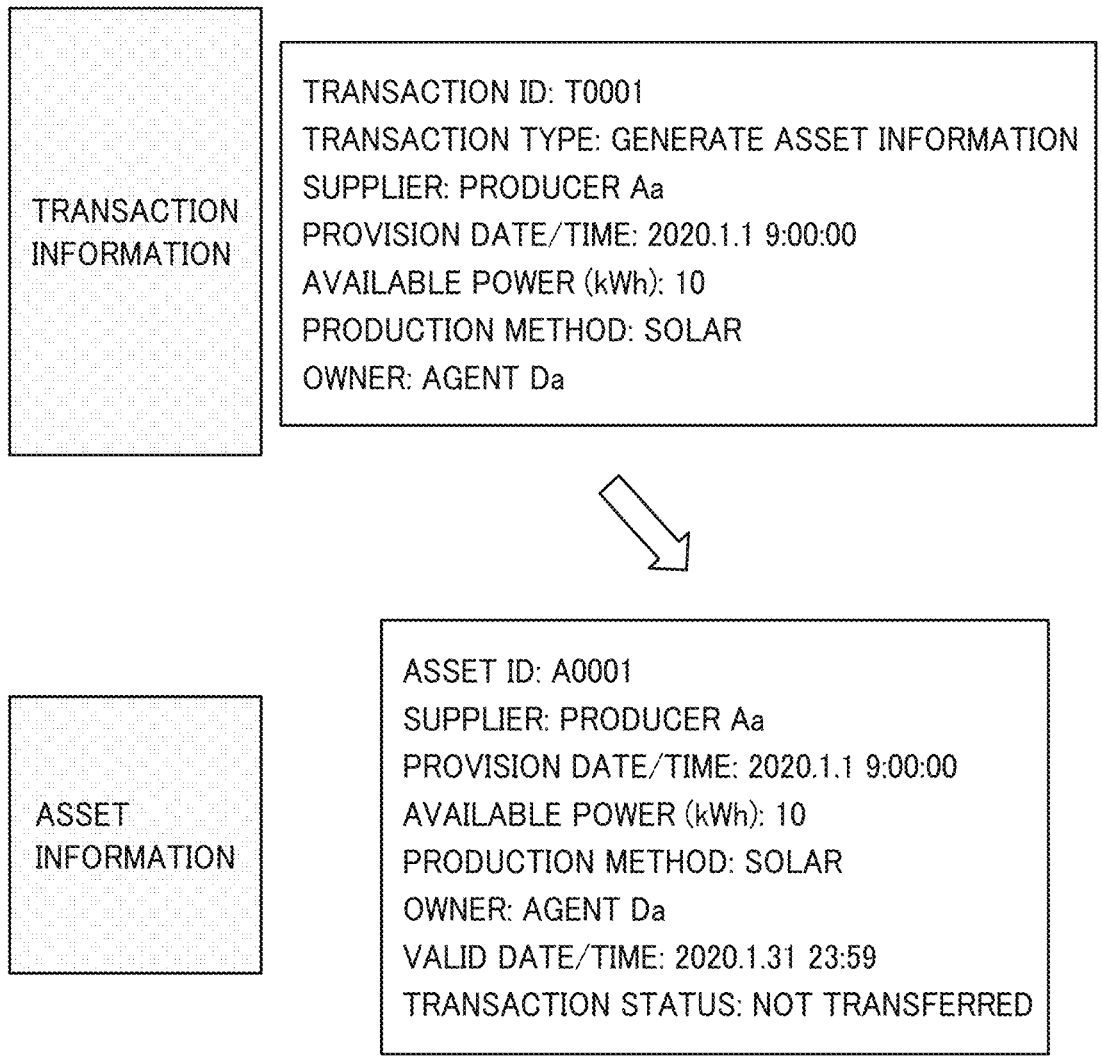
FIG. 15 is a conceptual diagram illustrating transaction information and asset information according to the exemplary embodiment.

Referring now to FIGS. 14 and 15, processing of setting the intermediary agent as an owner of the asset provided by the supplier is described, according to the embodiment. FIG. 14 is a sequence diagram illustrating processing of setting the intermediary agent as an owner of the asset provided by the supplier, according to the embodiment. FIG. 15 is a conceptual diagram illustrating transaction information and asset information according to the embodiment. The following describes the example case in which the smart meter 3a of the producer Aa requests the node 9a to set the intermediary agent as an owner of the asset.

As illustrated in FIG. 14, the measurement unit 33a measures electricity supplied from the power generator 4a to the power grid 10 (S61). The transmission and reception unit 31a of the smart meter 3a transmits a request for generating asset information to one of the nodes 9 (such as the node 9a) of the blockchain network 90 every predetermined time (for example, every 30 minutes) (S62). This request includes an electronic certificate certifying that the producer Aa is a legitimate registered supplier, and supplier information, so that the smartphone 2a of the producer Aa as the supplier can access the blockchain network 90. The supplier information includes a type of requester (in this example, supplier), and various information on the supplier of the asset (in this example, producer Aa) such as the supplier ID or name, the date and time that asset is supplied, an available amount of asset, a production method of asset, and an owner of asset. Accordingly, the transmission and reception unit 91 of the node 9a receives the request for generating asset information. This supplier information is information used for generating the transaction information illustrated in FIG. 15. The contents of the supplier information are determined in advance by a smart contract of the blockchain (contract automation). The supplier name is an example of supplier identification information for identifying the supplier of asset such a producer of electricity. The supplier name may be replaced by a supplier ID.

Next, the verification unit 93 of the node 9a verifies the certificate and the supplier information received at S62 (S63). The verification is a process of determining whether or not the certificate received at S62 is a certificate of the supplier (producer Aa) that is registered in advance in the node 9. The verification further determines whether or not each item of information received at S62 has a predetermined content that is written in a predetermined format, such that transaction information and asset information can be generated. Further, the storing and reading unit 99 searches the asset generation authority management DB 9001 using information on a type of requester that is received at S62 as a search key to read out information on authority. Here, as illustrated in FIG. 9, since the supplier (producer Aa) has authority to request generation of asset information, the verifying unit 93 determines that the request for generation of asset information at S62 is valid. The following describes the example case in which the verification result indicates that verification is successful.

Next, the transaction processing unit 96 uses the supplier information received at S62 to generate transaction information as illustrated in FIG. 15 and stores the transaction information in the storage unit 9000 (S64). In this case, the transaction processing unit 96 assigns a transaction ID and sets a transaction type. The transaction information includes a transaction ID, transaction type, and supplier information (supplier name or ID, provision date and time, available amount (power), production method, and owner).

Of these items, the transaction ID is an example of unique identification information for identifying transaction information. The transaction type is information indicating a type of processing to be performed in relation to the asset subjected to transaction. Specifically, the transaction type indicates an instruction in relation to asset information, based on transaction information. In FIG. 15, since the transaction type is generation of asset information, the asset processing unit 97 generates asset information. The supplier ID is identification information identifying a supplier of asset. The provision date and time is information indicating the date and time when the asset is supplied from the supplier. The available amount is information indicating an amount of electricity (electric energy) that the supplier can provide within a certain time period defined by the provision date and time. The type of production method is information indicating a production method of asset illustrated in FIG. 8B. The owner is information indicating an owner of asset, who has ownership of the asset.

Next, the asset processing unit 97 generates the asset information illustrated in FIG. 15 according to the transaction information illustrated in FIG. 15 and stores the asset information in the storage unit 9000 (S65). In this case, the asset processing unit 97 sets, as items of the asset information, the supplier information (supplier ID, date and time of provision, available amount, production method, and owner) in the transaction information, the transaction valid date and time, and the transaction status of the asset information. The transaction valid date and time is set, for example, one month after the date and time of provision. Further, the transaction status is information indicating whether or not the asset information has been transferred (assigned or not) to the user by the intermediary server 5. In FIG. 15, the transaction status of "not transferred" indicates that the asset has not been transferred to (allocated to) the user, that is, the intermediary agent has not yet provided the asset information to the user.

Further, the transmission and reception unit 91 of the node 9a distributes the transaction information generated at S64 as a block to the other nodes 9 (the nodes 9b, 9c, and 9d) of the blockchain network 90 (S66). Each of the other nodes 9 verifies the block, and adds the verified block to a chain of blocks already saved in each node. Each of the other nodes 9 then generates asset information in the same manner as S65 according to the transaction information, and stores the asset information in each storage area. A plurality of items of transaction information may be stored in one block.

Next, the transmission and reception unit 91 of the node 9 transmits a response to the smart meter 3a in response to the request received at S62 (S67). This response indicates that processing performed in response to the request received at S62 succeeded or failed. Accordingly, the transmission and reception unit 31a of the smart meter 3a receives the response. When the verification result of the verification unit 93 at S63 indicates that the certificate is invalid, processing of S64 to S66 is not performed. At S67, the transmission and reception unit 91 transmits a response indicating failure.

Next, at the smart meter 3a, the storing and reading unit 39a stores contents of the response in the Storage unit 3000a (S68).

As described above, the asset information indicating that the owner of the asset is the intermediary agent Da is managed on the blockchain network, to complete processing of providing asset information from the supplier to the intermediary agent.

Figure 16:
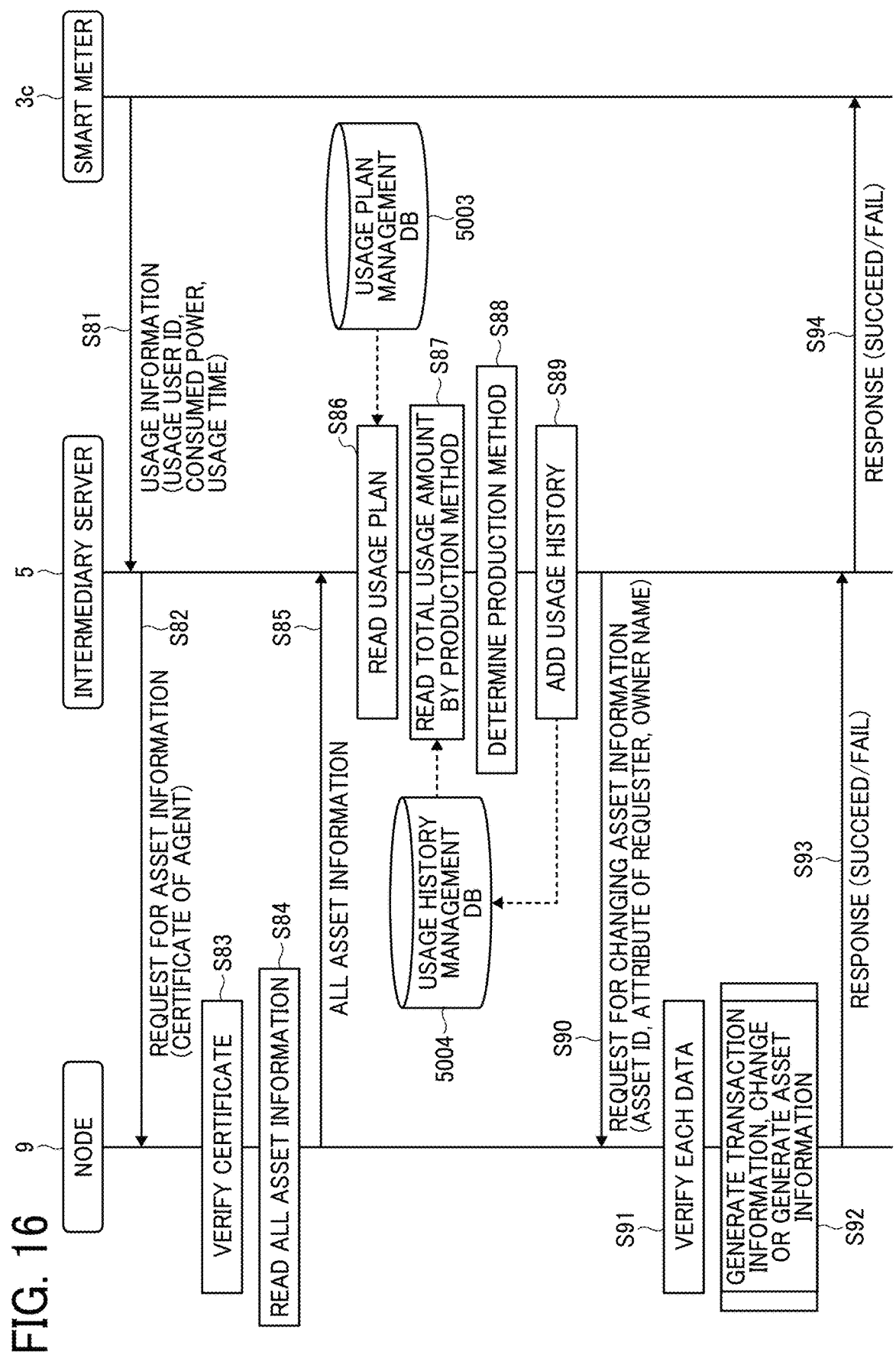
FIG. 16 is a sequence diagram illustrating processing of setting the user as an owner of the asset, according to the exemplary embodiment.
Figure 19:
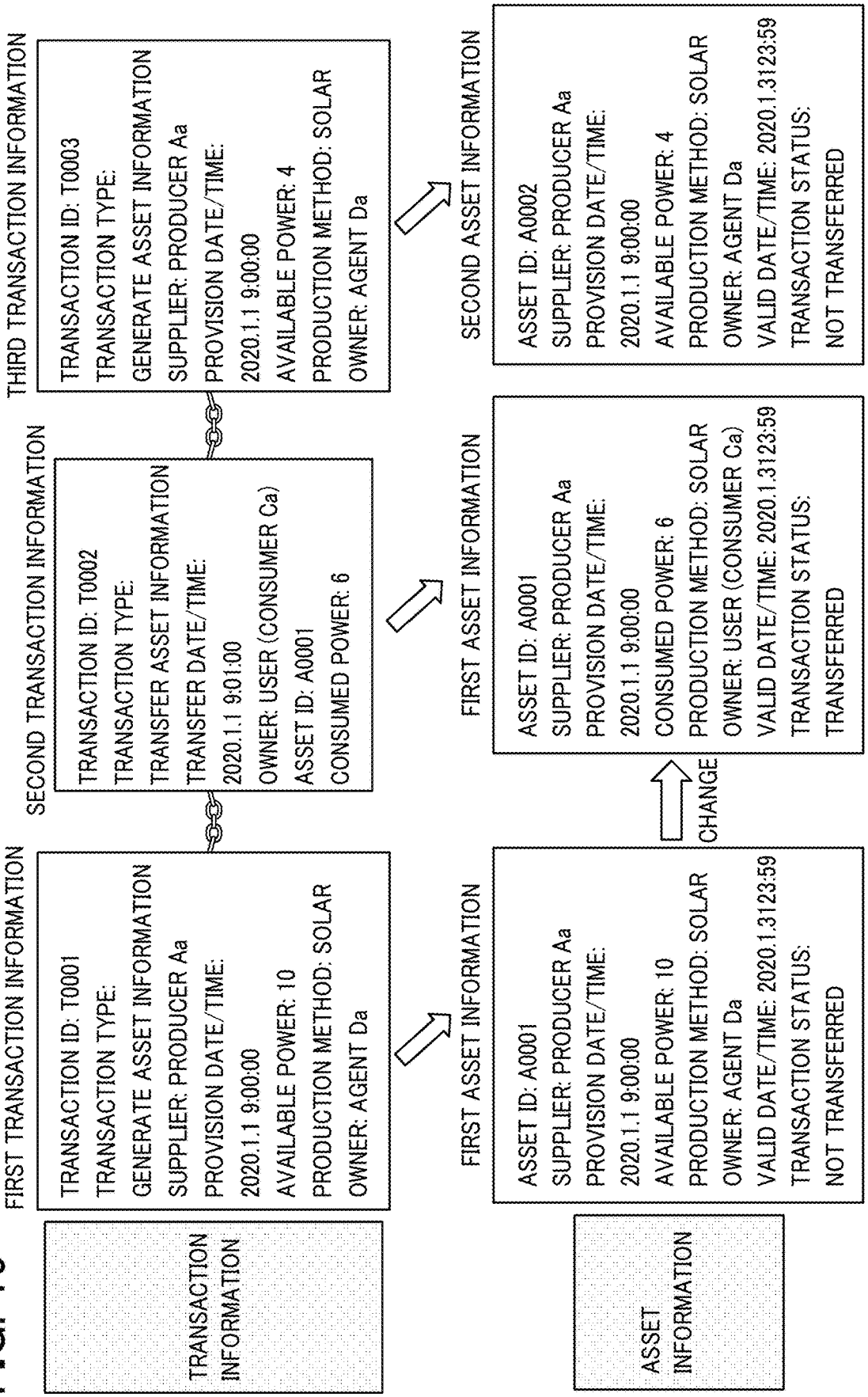
FIG. 19 is a conceptual diagram illustrating transaction information and asset information, when estimated electricity consumption is less than electricity consumption that is available, according to the exemplary embodiment.

Processing of Providing Asset Information from the Intermediary Agent to the User Referring now to FIGS. 16 and 19, processing of setting the user as an owner of the asset, which is owned by the intermediary agent after processing of FIG. 13, is described, according to the embodiment. FIG. 16 is a sequence diagram illustrating processing of setting the user as an owner of the asset, according to the embodiment.

First, the transmission and reception unit 31c of the smart meter 3c of the consumer Ca transmits usage information on usage of electricity, as asset, every predetermined time (for example, every 30 minutes) via the communication network 100 (S81). This usage information includes various information on electricity as asset, such as a usage status of electricity, a user ID for identifying the consumer Ca as the user, the amount of electricity being used, and a time during when electricity is used. The transmission and reception unit 51 of the intermediary server 5 receives the usage information. The transmission and reception unit 51 transmits a request for all asset information in which the intermediary agent Da of the intermediary server 5 is set as an owner, to the node 9 of the blockchain network 90 (S82). This request includes an electronic certificate certifying that the intermediary agent Da is a legitimate registered intermediary agent, and information indicating the intermediary agent Da as an owner, so that the intermediary server 5 of the intermediary agent Da can access the blockchain network 90. Accordingly, the transmission and reception unit 91 of the node 9 receives the request for all asset information.

Next, the verification unit 93 of the node 9 verifies the certificate received at S82 (S83). The certificate verification is a process of determining whether or not the certificate received at S83 is a certificate of the intermediary agent (in this example, the intermediary agent Da) that is registered in advance in the node 9. The following describes the example case in which the verification result indicates that verification is successful.

The storing and reading unit 99 of the node 9 reads out all items of asset information regarding assets indicating that the intermediary agent Da of the intermediary server 5 as the owner (S84). The transmission and reception unit 91 transmits all items of asset information read at S84 to the intermediary server 5 (SS5). The transmission and reception unit 51 of the intermediary server 5 receives all the asset information. Accordingly, the intermediary server 5 receives all asset information with ownership that is currently assigned to the intermediary agent Da and can be allocated to the user. Next, the storing and reading unit 59 of the intermediary server 5 searches the usage plan management DB 5003 using the user ID received at S81 as a search key to read out usage plan information corresponding to the user ID (S86). Further, the storing and reading unit 59 searches the usage history management DB 5004 using the user ID received at S81 as a search key to read out most updated value of total amount of asset, which has been used, by each production method corresponding to the user ID (S87). For example, from the usage history management DB 5004 of FIG. 8B, the storing and reading unit 59 reads 20 (kWh) as total amount of electricity produced from solar light, and 160 (kWh) as total amount of electricity produced from oil, of all electricity consumed by the user.

Next, the asset determination unit 53 determines a type of production method of asset, so as to determine particular asset information to be transferred to the consumer Ca as the user, based on the usage plan information read at S86 and total usage amount of asset by each production method that is read at S87 (S88). For example, when the usage plan information indicates two types of production method "solar light" and "oil" are set for the consumer Ca, and the renewable energy usage ratio of 40% is set, since the usage history information indicates that the total usage amount is 20 kWh for solar and 160 kWh for oil (that is, the renewable energy usage ratio is less than 40%), the asset determination unit 53 determines the production method to be "solar light" so as to achieve the renewable energy usage ratio of 40%. Accordingly, the asset determination unit 53 selects, from among all asset information received at S85, asset information having the production method of solar light, to be transferred to the customer Ca.

The storing and reading unit 59 stores information on usage of asset produced by the production method determined at S88, that is, usage of electricity produced from solar light as indicated by the asset information determined at S88, in the usage history management DB 5004 (S89). Specifically, for example, the storing and reading unit 59 adds, to the usage history management DB 5004 (see FIG. 8B), a record having the usages date and time of "2020.1.1 9:00-9:30", the usage amount of 10 kWh, the production method of solar light, and the total usage amount of electricity produced from solar light of 30 kWh.

Next, the transmission and reception unit 51 of the intermediary server 5 transmits a request for changing the asset information to the node 9 of the blockchain network 90 (S90). This change request includes an asset ID for identifying the asset information indicating the asset produced from the production method that is determined at S88, from among the asset information received at S85. The change request, transmitted at S90, also includes various information such as a type (attribute) of a requester (in this example, intermediary agent), a new owner, and an amount of asset consumed (consumed power). When there is a plurality of items of asset information on the asset produced using the specific type of production method determined at S88, the transmission and reception unit 51 determines a request for changing particular asset information, related to the asset having a valid date closet to the current date, from among the plurality of items of asset information. The owner name is an example of owner identification information for identifying the owner of asset. The owner name may be replaced by an owner ID.

Next, at the node 9, the verification unit 93 verifies each item of information (asset ID, owner name, consumed power) received at S90 (S91). This verification processing is for determining whether or not each item of information received at S90 has a predetermined content that is written in a predetermined format. Further, in the verification processing, the storing and reading unit 99 searches the asset generation authority management DB 9001 using information on a type of requester that is received at S90 as a search key to read out information on authority. Here, as illustrated in FIG. 9, since the intermediary agent (intermediary agent Da) has authority to request change of asset information, the verifying unit 93 determines that the request for change of asset information at S90 is valid. The following describes the example case in which the verification result indicates that verification is successful.

Figure 17:
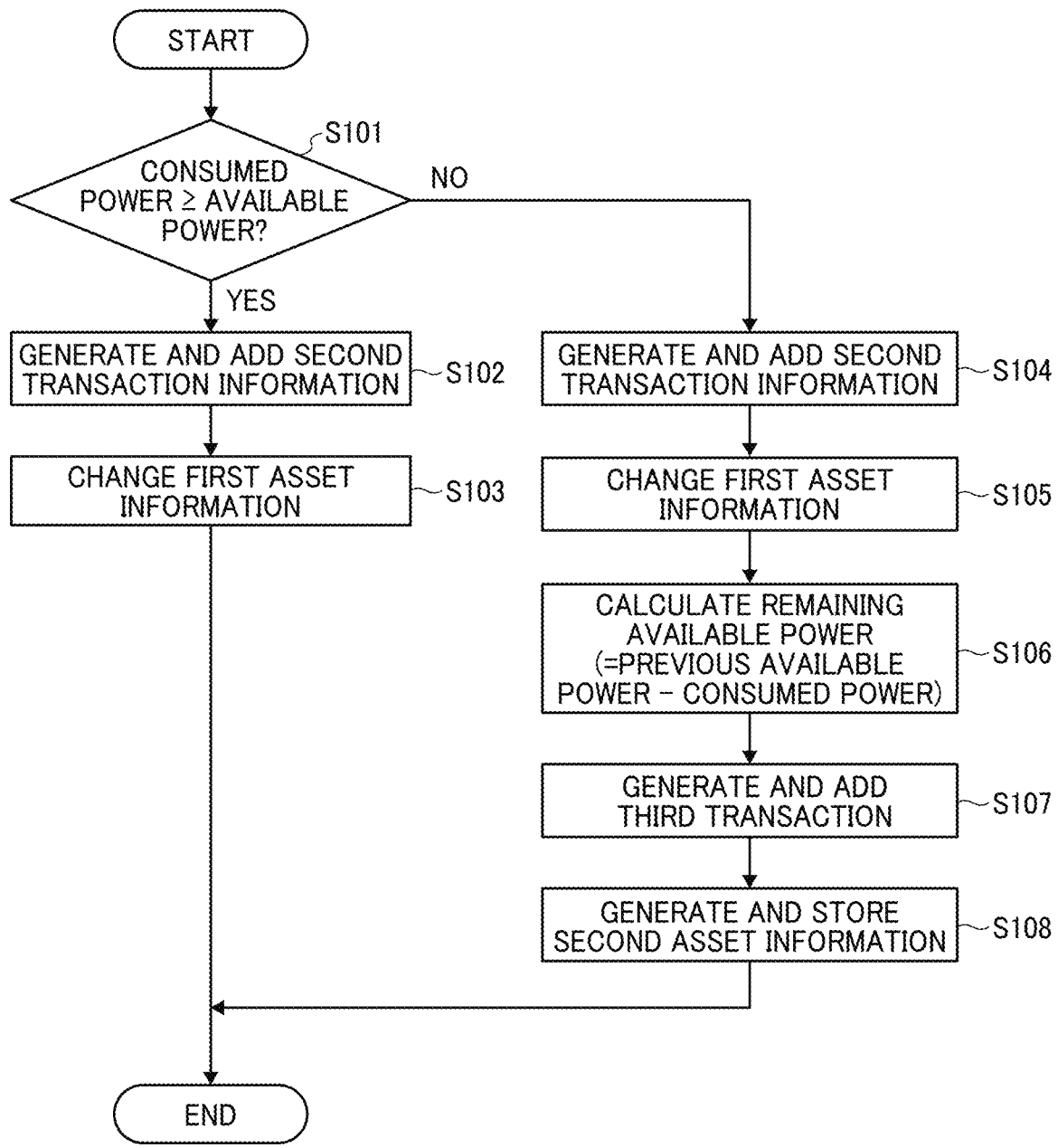
FIG. 17 is a flowchart illustrating processing of generating transaction information and generating or changing asset information, according to the exemplary embodiment.
Figure 18:
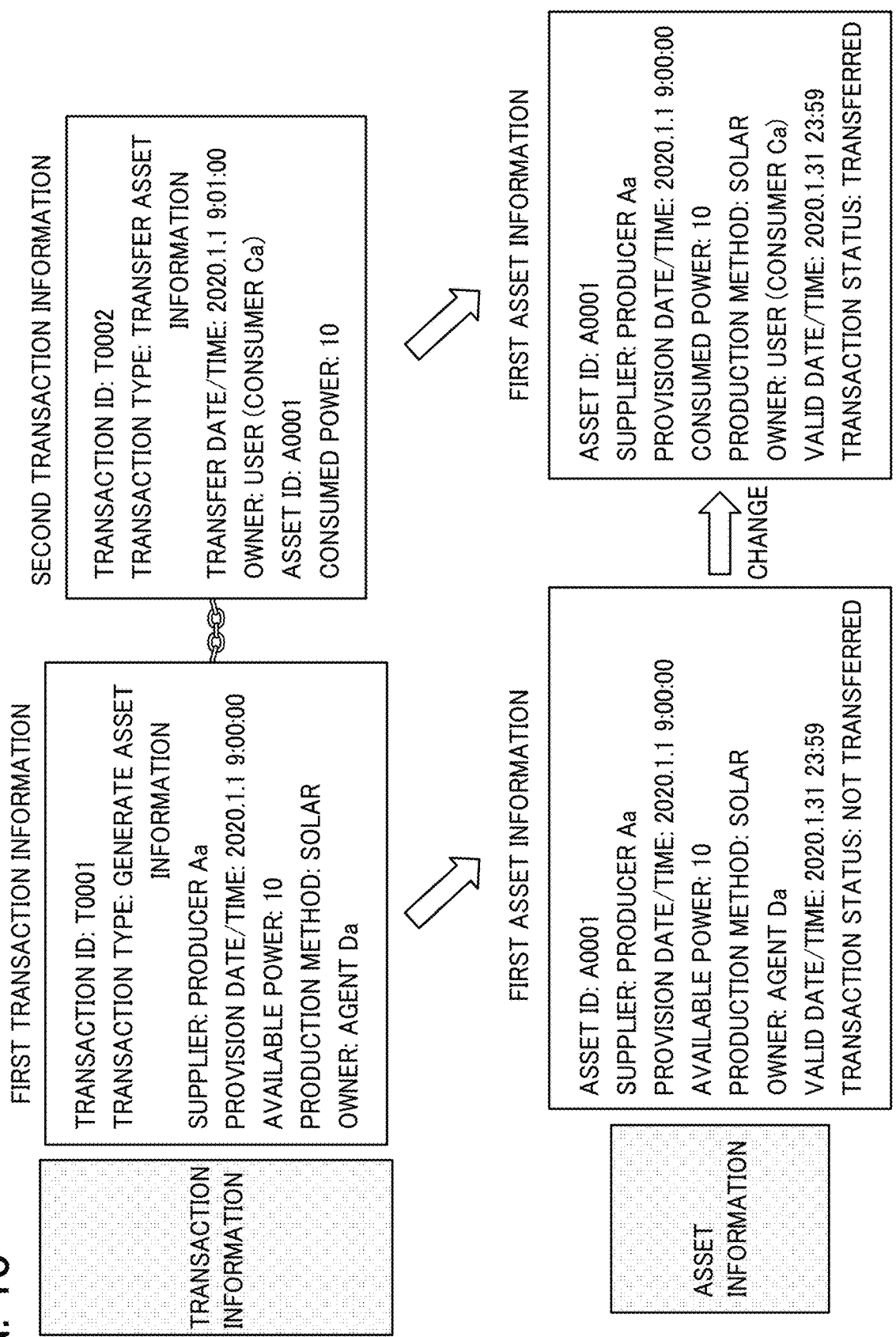
FIG. 18 is a conceptual diagram illustrating transaction information and asset information, when estimated electricity consumption is equal to or greater than electricity consumption that is available, according to the exemplary embodiment.

Next, the node 9 generates transaction information and changes (or generates) asset information, according to the change request received at S90 (S92). The processing of S92 is described in detail with reference to FIGS. 17 to 19. FIG. 17 is a flowchart illustrating detailed processing of S91 of FIG. 16, specifically, processing of generating transaction information and generating or changing asset information. FIG. 18 is a conceptual diagram illustrating transaction information and asset information, when the estimated consumption of electricity is equal to or greater than the amount of electricity that can be supplied (YES at S101 of FIG. 17). FIG. 19 is a conceptual diagram illustrating transaction information and asset information, when the estimated consumption of electricity is less than the amount of electricity that can be supplied (NO at S101 of FIG. 17).

As illustrated in FIG. 17, the determination unit 95 of the node 9 determines whether or not the estimated consumed amount of asset by the user that is received at S90 (in this example, the estimated consumed amount of the consumer Ca) is equal to or greater than the available amount that is indicated by the asset information (S101).

Example that all Available Amount is Consumed

When the determination unit 95 determines that the estimated consumed amount of asset by the user is equal to or greater than the available amount indicated by the asset information (YES at S101), the transaction processing unit 96 generates second transaction information as illustrated in FIG. 18. Then, the transaction processing unit 96 adds a block containing the second transaction information to the chain of blocks containing the first transaction information, which is stored in the storage unit 9000 (S102). Then, the asset processing unit 97 changes contents of the first asset information according to the second transaction information (S103).

The processing of S102 and S103 is described in detail with reference to FIG. 18. The first transaction information and the first asset information illustrated on the left side of FIG. 18 are the same as the transaction information and the asset information of FIG. 15, respectively. The following describes an example case in which, after the smart meter 3a sets the owner of the asset to the intermediary agent Da (the first asset information is generated based on the first transaction information), the intermediary server 5 changes the owner of the asset to the consumer Ca (the first asset information is changed based on the second transaction information), as the intermediary agent Da intermediates transfer of the asset information (ownership of asset).

At S102, the transaction processing unit 96 generates the second transaction information as illustrated in FIG. 18. The second transaction information includes a unique transaction ID and a transaction type indicating transfer of asset information. The second transaction information additionally includes the transfer date and time when transfer of asset information is intermediated, a new owner of asset as a result of transfer, an asset ID for identifying the asset information that is transferred, and a consumed amount of asset (in this example, electricity) received at S90.

Then, at S103, the asset processing unit 97 changes the first asset information as illustrated in FIG. 18. The asset processing unit 97 changes the "available amount (power)" in the first asset information to the "consumed amount (power)" in the second asset information, and changes the owner from the "intermediary agent Da" in the first asset information to the "consumer Ca" in the second asset information. Furthermore, since all of available amount has been consumed (YES at S101), no more asset can be allocated. Therefore, the asset processing unit 97 changes the transaction status from "not transferred" in the first asset information to "transferred" in the second asset information. The asset information whose transaction status has been changed to "transferred" through this processing will be excluded from a target of transfer in the future. Therefore, the transaction processing unit 96 does not refer to the asset information having the transaction status of "transferred", as asset information subjected to processing the transaction information having the transaction type of "transfer asset information". That is, the asset information excluded from the target of transfer is not re-transferred.

As described above, when all the available amount of the asset is consumed, new asset information is not generated, but the asset information is changed.

Subsequently, returning to FIG. 16, the transmission and reception unit 91 of the node 9 transmits a response to the request received at S90 to the intermediary server 5 (S93). This response indicates that processing performed in response to the request received at S90 succeeded or failed. The transmission and reception unit 51 of the intermediary server 5 receives the response. When the verification result of the verification unit 93 at S91 indicates that the certificate is invalid, processing of S92 is not performed. At S93, the transmission and reception unit 91 transmits a response indicating failure.

Next, the transmission and reception unit 51 of the intermediary server 5 transmits a response to the information received at S81 to the smart meter 3c (S94). Accordingly, the transmission and reception unit 31c of the smart meter 3c receives the response from the intermediary server 5. This response includes contents of response (success or failure) received at S93 and is stored for management or displayed by the smart meter 3c.

Example that Not all Available Amount is Consumed

At S101 of FIG. 17, when the determination unit 95 determines that the estimated consumed amount of asset by the user is less than the available amount indicated by the asset information (NO at S101), the transaction processing unit 96 generates second transaction information as illustrated in FIG. 19. Then, the transaction processing unit 96 adds a block containing the second transaction information to the chain of blocks containing the first transaction information, which is stored in the storage unit 9000 (S104). The asset processing unit 97 changes contents of the first asset information according to the second transaction information (S105).

The processing of S104 and S105 is described in detail with reference to FIG. 19. The first transaction information and the first asset information illustrated on the left side of FIG. 19 are the same as the transaction information and the asset information of FIG. 15, respectively. The following describes an example case in which, after the smart meter 3a sets the owner of the asset to the intermediary agent Da (the first asset information is generated based on the first transaction information), the intermediary server 5 changes the owner of the asset to the consumer Ca (the first asset information is changed based on the second transaction information), as the intermediary agent Da intermediates transfer of the asset information (ownership of asset).

At S104, the transaction processing unit 96 generates the second transaction information as illustrated in FIG. 19. The second transaction information includes a unique transaction ID and a transaction type indicating transfer of asset information. The transaction type of "transfer asset information" does not only function as an instruction to change the owner of the asset in the first asset information, but also functions as an instruction to generate third transaction information used for generating second asset information indicating ownership of remaining asset when there is excessive amount of asset after transfer (after consumption). Accordingly, the transaction processing unit 96 continues processing to generate the third transaction information. The second transaction information additionally includes the transfer date and time when transfer of asset information is intermediated, a new owner of asset as a result of transfer, an asset ID for identifying the asset information that is transferred, and a consumed amount of asset (in this example, electricity) received at S90.

Then, at S105, the asset processing unit 97 changes the first asset information as illustrated in FIG. 19. The asset processing unit 97 changes the "available amount (power)" in the first asset information to the "consumed amount (power)" in the second asset information, and changes the owner from the "intermediary agent Da" in the first asset information to the "consumer Ca" in the second asset information. Furthermore, since the consumed amount of asset can no longer be allocated, the asset processing unit 97 changes the transaction status from "not transferred" in the first asset information to "transferred" in the second asset information. However, what is different from the case of FIG. 18 is that there is a remaining amount (of electricity) after the transfer (NO at S101). Therefore, the transaction processing unit 96 calculates a remaining available amount (S106). In this case, the remaining available amount (here, "4") can be obtained by subtracting the consumed amount (here, "6") from the previous available amount (here, "10").

Subsequently, in order to newly generate asset information to manage remaining available amount, the transaction processing unit 96 generates third transaction information as illustrated in FIG. 19. Then, the transaction processing unit 96 adds a block containing the third transaction information to the chain of blocks containing the second transaction information, which is stored in the storage unit 9000 (S107). The asset processing unit 97 generates second asset information according to the third transaction information, and stores the second asset information in the storage unit 9000 (S108).

The processing of S107 and S108 is described in detail with reference to FIG. 19. The following describes an example case in which, after the intermediary server 5 changes the owner of the asset to the consumer Ca (the first asset information is changed based on the second transaction information and the third transaction information is generated), the intermediary server 5 newly stores the remaining available amount (the second asset information is generated based on the third transaction information), to manage the asset information on the remaining available amount as a subject to transfer to be intermediated by the intermediary agent Da.

At S107, the transaction processing unit 96 generates the third transaction information as illustrated in FIG. 19. This third transaction information includes the same data items as the first transaction information, although specific values may be different from those of the first transaction information. The third transaction information includes a unique transaction ID and "generate asset information" as a transaction type. The third transaction information includes information on a supplier of the asset information, the provision date and time of the asset information, the available amount of asset, the production method, and the owner of asset.

Then, at S128, the asset processing unit 97 generates the second asset information as illustrated in FIG. 19. This second asset information have same data items as those of the first asset information, but specific values of the items may be different from those of the first asset information. Specifically, the second asset information differs from the first asset information, such that the available amount has a value calculated at S106 (here, "4").

As described above, when there is a remaining available amount of asset, new asset information is generated, which indicates the remaining available amount.

The processing then returns to FIG. 16 to perform processing as described above referring to S93 and 94, such that description thereof is omitted.

Facilitating Procedure for Obtaining Production Method Certificate

Figure 20:
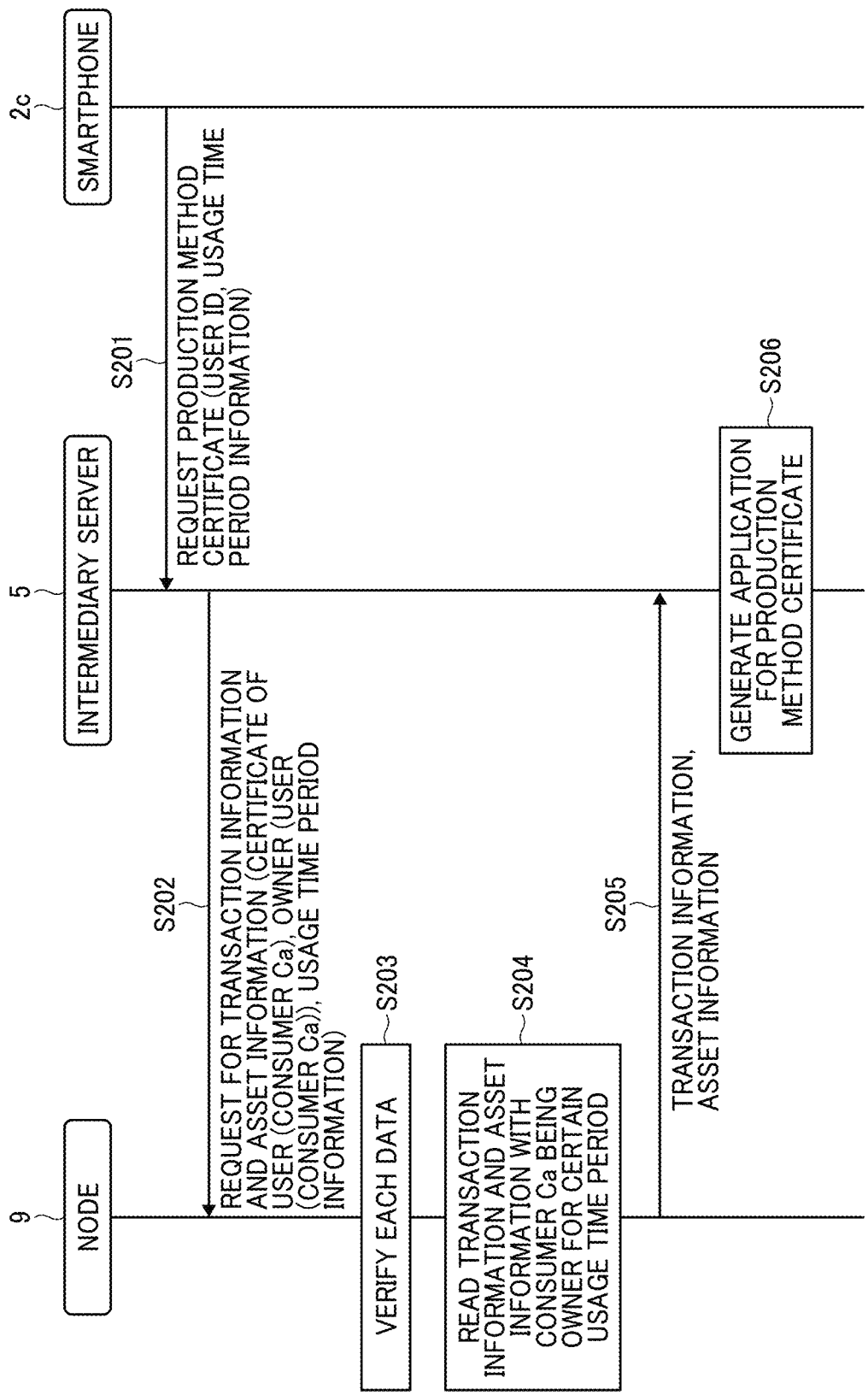
FIG. 20 is a sequence diagram illustrating processing of facilitating a production method certificate of an asset, according to the exemplary embodiment.

Next, referring to FIG. 20, processing of facilitating procedure for obtaining a production method certificate is described according to the embodiment. FIG. 20 is a sequence diagram illustrating processing of facilitating procedure for obtaining a production method certificate of asset, according to the embodiment. The consumer Ca transmits a request for obtaining a production method certificate from the certification authority E, to the intermediary agent Da. The production method certificate certifies that electricity consumed by the consumer Ca has been produced from renewable energy, such as a solar light. The following describes this processing in detail.

As illustrated in FIG. 20, according to operation of the consumer Ca on the smartphone 2c, the transmission and reception unit 21c transmits a request for obtaining a production method certificate of asset via the communication network 100 (S201). Accordingly, the transmission and reception unit 51 of the intermediary server 5 receives the request for obtaining a production method certificate. This request includes a user ID for identifying the consumer Ca as the user, and information on a usage time period during when asset is being used. For example, the consumer Ca requests for a production method certificate of asset, for a usage time period from Jan. 1, 2020 to Jan. 31, 2020.

Next, the transmission and reception unit 51 of the intermediary server 5 transmits a request for transaction information and asset information to the node 9 of the blockchain network 90 (S202). This request includes information on a certificate of the user (here, consumer Ca) that the intermediary server 5 previously acquires from the smartphone 2c (certificate of the intermediary server 5), information indicating the user as the owner (here, consumer Ca), and a usage time period. Accordingly, the transmission and reception unit 91 of the node 9 receives the request. The certificate of the intermediary server 5 has the same contents as that of the certificate transmitted from the intermediary server 5 to the node 9 at S82. Further, the usage time period information has the same contents as that of the usage time period information received at S121.

Next, the verification unit 93 of the node 9 verifies the certificate received at S202 (S203). The certificate verification is a process of determining whether or not the received certificate is a certificate of the server (in this example, the intermediary server) that is registered in advance in the node 9. The following describes the example case in which the verification result indicates that verification is successful.

Next, the storing and reading unit 99 reads out the transaction information and the asset information in which the consumer Ca is set as the owner, within a predetermined usage time period indicated by the usage time period information received at S202 (S204). In this case, the storing and reading unit 99 reads out particular transaction information having the usage date and time that fills within the predetermined usage time period and the new owner of the consumer Ca. Further, the storing and reading unit 99 reads the asset information having the asset ID, which is indicated by the particular transaction information that is read.

Then, the transmission and reception unit 91 of the node 9 transmits the requested transaction information and asset information to the intermediary server 5 (S205). Accordingly, the transmission and reception unit 51 of the intermediary server 5 receives the transaction information and the asset information.

Next, at the intermediary server 5, the creation unit 58 creates an application form to be submitted by the intermediary agent to the certification authority E, based on the transaction information and the asset information received at S205 (S206). This application form is used to apply for a production method certificate to prove the type of production method for the asset.

Subsequently, as illustrated in FIG. 1, the intermediary agent Da sends the application form created at S206 to the certification authority E by mail or the like (S1). Then, the certification authority E creates a production method certificate of asset, which certifies that 40% of electricity consumed by the consumer Ca has been produced from renewable energy such as solar light, and sends the production method certificate by mail or the like to the intermediary agent (S2). Then, the intermediary agent Da sends the production method certificate to the consumer Ca by mail or the like (S3). If necessary, the certification authority E may acquire transaction information and asset information from the blockchain network 90 and confirm the contents before issuing the production method certificate.

The processing of facilitating procedure for obtaining the production method certificate by the intermediary agent Da then ends. The consumer Ca is able to use the production method certificate to enhance public image of the company or apply the government for a subsidy based on use of renewable energy.

As described above, the node 9 obtains data of a certificate from the smart meter 3 at S62 or the intermediary server 5 at S91. The node 9 may then receive a request for generating or changing asset information, from any third party that is not related to the supplier of asset or the consumer of asset. If the node 9 accepts such request for generating or changing asset information, the asset information may not accurately reflect production of asset by the supplier or transfer of ownership of asset between the supplier and the consumer. On the other hand, if the node 9 does not accept any request for generating or changing asset information from the third party, the third party, including the intermediary agent, is not able to intermediate transfer of ownership of asset information between the supplier and the consumer. In view of the above, according to one or more embodiments, the node 9 not only checks whether a requester has an access right based on data of a certificate, but also checks whether or not a requester (such as a user of the smart meter 3 or the intermediary server 5) who has requested generation or change of asset information has authority to request generation or change of asset information. This prevents the node 9 on the blockchain network 90 from accepting a request to generate or change asset information, received from the third party that is not related to the supplier or consumer, while accepting a request to generate or change asset information from a specific third party such as the intermediary agent Da.

For some assets such as electricity, even though qualities of assets provided to the user are kept constant, it has been difficult to prove how the asset is produced. In view of this, according to the above-described embodiments, the node 9 of the blockchain network 90 generates asset information indicating a type of production method of asset and ownership of asset, and transaction information from which such asset information is generated. Through managing these asset information and transaction information, a production method of asset can be verified, and a production method certificate can be issued based on this verification.

Moreover, in order to encourage stable consumption of electricity, it is necessary to adjust the consumed electricity and the produced electricity in real time to make them equal. Since the blockchain is a decentralized ledger system, it takes a certain amount of time to confirm consistency of each ledger information via the network. Therefore, it is not suitable to apply the blockchain technology to track use of such asset, which requires responsiveness in realtime, as in the case of electricity use. In view of this, in the present embodiment, the intermediary server 5 is configured to transmit, to the blockchain network 90, a request for changing the ownership of the asset information on the blockchain network 90 from the original owner to the user (consumer Ca), not at a time when the consumer Ca starts using the asset (electricity), but after the consumer Ca has consumed the asset (electricity) (S89). Through this processing, which allows processing like deferred payment, the blockchain technology can be applied to exchange of asset, or transfer of ownership of asset, requiring real-time processing. While the above-described embodiment uses electricity as such asset requiring real-time processing, any other type of energy, is applicable as secondary energy such as hydrogen. Moreover, since the intermediary server 5 changes the asset information managed by the blockchain network 90 on behalf of the supplier (producer Aa, etc.) and the user (consumer Ca, etc.), the supplier (producer Aa, etc.) and the user (consumers Ca, etc.) can exchange electricity, without any need to consider whether the asset information has been changed.

Further, the intermediary server 5 is able to transfer the ownership of particular asset produced with a specific production method, such that exchange of electricity produced from renewable energy such as solar light can be effectively tracked.

In any one of the above-described embodiments, the smart phone 2, smart meter 3, and intermediary server 5, which access the node 9, are examples of a communication device.

In the above-described embodiments, a request for generating asset information transmitted and received at S62, and a request for changing asset information transmitted and received at S90, are examples of a request for processing asset information, such that the request for processing asset information is not limited to these requests.

For example, the request for changing asset information is one example of a request for processing asset information, which results in change in contents of the asset information, such that only an entity with authority to coordinate a transfer of asset (such as an intermediary agent) can have such request.

While processing of asset information may include, for example, transmitting, receiving, storing, and reading asset information, since such processing does not result in change in contents of asset information itself, such processing may be excluded from the above-described request for processing asset information, which results in change in contents of the asset information.

In any one of the above-described embodiments, the asset information includes information on the owner of the asset, however, the asset information may not include such information on the owner. For example, when the user is consuming electricity produced by the user, such that the user is the producer of the asset, there is no need to transfer the asset to another entity (another person or another company), as long as a type of production method can be verified.

Further, in any one of the above-described embodiments, electricity is used as an example of asset, which is an item having value. Examples of asset include any other tangible asset that physically exists, and any other non-tangible asset that does not physically exist.

Examples of tangible asset include, but are not limited to, foods such as grains, vegetables, fruits, meats, marine products or processed foods. For example, by tracking asset information including additional information on how the food is produced, determination of whether the food confirms some standards (for example, organic labeling standards) can be made. When the assets are grains, vegetables and fruits, the asset information includes information indicating whether or not pesticides have been used, or information indicating a producer or a place of production. When the asset is meat, the asset information includes information indicating whether or not the animal is bred using a genetically modified crop, or information indicating a producer or a place of production. When the asset is a marine product such as fish or shellfish, the asset information includes information indicating a natural product or aquaculture, or information indicating a producer (fisherman) or a production area (fishing area). When the asset is a processed product, the asset information includes information indicating an allergen, information indicating whether or not the product has been processed using a genetically modified crop, or information indicating a location of a processor or a processing plant.

Examples of non-tangible asset include, but are not limited to, real estate such as land and buildings, and movable property such as goods or quantity of goods. When the asset is real estate, the asset information includes information such as ownership of the asset. When the asset is movable property, the asset intimation includes information such as ownership of the asset.

On the other hand, examples of non-tangible asset include, but are not limited to, tokens (virtual currency) or quantity of tokens, carbon dioxide emission credits, intellectual property rights, and contracts. When the asset is a token, the asset information includes information on such as ownership of the asset. When the asset is a carbon dioxide emission credit, the asset information includes information on such as ownership of the asset. When the asset is a right such as an intellectual property right, the asset information includes information on such as the owner of the right, the transferee of the right, and the licensee. When the asset is a contract, the asset information includes information on such as contract conditions and contract performance. In addition or in alternative to contracts, treaties, agreements, promises, and memorandums (memos) may be treated as asset.

Further, other types of asset that can be managed in a substantially similar manner as the example case of electricity, to allow postpaid processing, include gas (other form of energy), water, and communication. In the case of gas, water, or communication, the asset information includes information such as ownership of the asset.

Each of the above-described hardware components, like CPU 201, 301, 501, and 901, may be a single device or a plurality of devices.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on Chip (SOC), and graphical processing unit (GPU), and conventional circuit components arranged to perform the recited functions.

The above-described embodiments are illustrative and do not limit the present invention. Thus, numerous additional modifications and variations are possible in light of the above teachings. For example, elements and/or Matures of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry, includes a programmed processor, as a processor includes circuitry. A processing circuit also includes devices such as an application specific integrated circuit (ASIC), a digital signal processor (DSP), field programmable gate array (FPGA), and conventional circuit components arranged to perform the recited functions.

The invention claimed is:

1. An apparatus in a blockchain network, the apparatus comprising:
a memory configured to store asset information and transaction information;
a communication circuit configured to receive a request from a smart meter via a network, wherein the request requests to process first asset information relating to information in the request, the information in the request including (i) an amount of electricity produced by a power generator, (ii) an owner of the electricity and (iii) a production method of the power generator which produced the electricity;
a determination circuit configured to determine, in response to the request received by the communication circuit, whether a user of the smart meter has authority to process the first asset information by referring to the asset information and transaction information stored in the memory;
a transaction processing circuit configured to
generate, based on a determination of the determination circuit indicating that the user of the smart meter has authority to process the first asset information, first transaction information according to the information included in the request and store the first transaction information in the memory; and
track the electricity using the first transaction information; and
an asset processing circuit configured to change a content of the asset information and process the asset information in the memory according to the tracked electricity, the first asset information and the first transaction information.

2. The apparatus of claim 1, wherein
the determination circuit is further configured to determine whether the user of the smart meter has an access right, and
the transaction processing circuit generates, based on a determination indicating that the user of the smart meter has the access right, the first transaction information.

3. The apparatus of claim 1, wherein
the communication circuit receives the request from an intermediary server, and
the asset processing circuit is configured to change the first transaction information based on a determination of the determination circuit indicating that the intermediary server has authority to process the first asset information.

4. The apparatus of claim 3, wherein the intermediary server is operated by an intermediary agent that intermediates a transfer of ownership of electricity.

5. The apparatus of claim 1, wherein the first asset information indicates that the production method of the electricity is one of a production of electricity using a renewable source, a production of electricity using fossil fuels, and a production of electricity using nuclear power.

6. The apparatus of claim 1, wherein the communication circuit is further configured to transmit a response indicating a processing failure to the smart meter, based on a determination of the determination circuit indicating that the user of the smart meter does not have authority to process the first asset information.

7. The apparatus of claim 1, wherein the memory stores, for each user of a plurality types of users, information indicating whether the user has authority to process the asset information.

8. The apparatus of claim 1, wherein the apparatus is configured to perform distributed processing within the blockchain network.

9. The apparatus of claim 8, wherein the processor is the communication circuit is configured to transmit the first transaction information to another apparatus of the blockchain network.

10. The apparatus of claim 9, wherein the communication circuit is further configured to transmit a response indicating a processing failure to an intermediary server, based on a determination of the determination circuit indicating that the user of the smart meter does not have authority to process the first asset information.

11. A method for an apparatus in a blockchain network, the method comprising:
storing asset information and transaction information in a memory;
receiving, by a communication circuit of the apparatus, a request from a smart meter via a network, wherein the request requests first asset information relating to information in the request, the information in the request including (i) an amount of electricity produced by a power generator, (ii) an owner of the electricity and (iii) a production method of the power generator which produced the electricity;
determining, by a determination circuit of the apparatus in response to the request received by the communication circuit, whether a user of the smart meter has authority to process the first asset information by referring to the asset information and transaction information stored in the memory; and
generating, based on a determination of the determining indicating that the user of the smart meter has authority to process the first asset information, first transaction information according to the information included in the request and storing the first transaction information in memory;

tracking the electricity using the first transaction information; and changing, by an asset processing circuit of the apparatus, a content of the asset information and processing the asset information in the memory according to the tracked electricity, the first asset information and the first transaction information.

12. The method of claim 11, further comprising:

determining, by the determination circuit, whether the user of the smart meter has an access an access right; and based on a determination of the determining indicating that the user of the smart meter has the access right, generating the first transaction information, which instructs processing of the first asset information.

13. The method of claim 11, further comprising transmitting, by the communication circuit, a response indicating a processing failure to the smart meter, based on a determination of the determining indicating that the smart meter does not have authority to process the first asset information.

14. The method of claim 11, further comprising performing distributed processing within the blockchain network.

15. The method of claim 14, further comprising:

transmitting the first transaction information to another apparatus of the blockchain network.

16. A non-transitory computer-readable medium encoded with computer-readable instructions that, when executed by an apparatus in a blockchain network, cause the apparatus to perform a method comprising:

storing asset information and transaction information in a memory;

receiving, by a communication circuit of the apparatus, a request from a smart meter via a network, wherein the request requests first asset information relating to information in the request, the information in the request including (i) an amount of electricity produced by a power generator, (ii) an owner of the electricity and (iii) a production method of the power generator which produced the electricity;

determining, by a determination circuit of the apparatus in response to the request received by the communication circuit, whether a user of the smart meter has authority to process the first asset information by referring to the asset information and transaction information stored in the memory; and generating, based on a determination of the determining indicating that the user of the smart meter has authority to process the first asset information, first transaction information according to the information included in the request and storing the first transaction information in memory;

tracking the electricity using the first transaction information; and changing, by an asset processing circuit of the apparatus, a content of the asset information and processing the asset information in the memory according to the tracked electricity, the first asset information and the first transaction information.

17. The apparatus of claim 1, wherein the memory stores, for each type of user, first information in association with second information, wherein the first information indicates whether the user has authority to request processing of the asset information, and the second information indicates whether the user has authority to change the asset information.

18. The apparatus of claim 1, wherein the first transaction information indicates a time at which a transfer of the electricity is intermediated, the owner of the electricity after the transfer is completed, information specifying the first asset information corresponding to the electricity subject to the transfer, and a consumed amount of the electricity.

19. The method of claim 11, wherein the first transaction information indicates a time at which a transfer of the electricity is intermediated, the owner of the electricity after the transfer is completed, information specifying the first asset information corresponding to the electricity subject to the transfer, and a consumed amount of the electricity.

* * * * *